(12) United States Patent
Yahata et al.

(10) Patent No.: US 10,960,497 B2
(45) Date of Patent: Mar. 30, 2021

(54) NANOPARTICLE COMPOSITE WELDING FILLER MATERIALS, AND METHODS FOR PRODUCING THE SAME

(71) Applicant: HRL Laboratories, LLC, Malibu, CA (US)

(72) Inventors: Brennan Yahata, Los Angeles, CA (US); Justin Mayer, Southbury, CT (US); John H. Martin, Los Angeles, CA (US)

(73) Assignee: HRL Laboratories, LLC, Malibu, CA (US)

(*) Notice: Subject to any disclaimer, the term of this patent is extended or adjusted under 35 U.S.C. 154(b) by 127 days.

(21) Appl. No.: 15/880,452

(22) Filed: Jan. 25, 2018

(65) Prior Publication Data

US 2018/0214991 A1    Aug. 2, 2018

Related U.S. Application Data

(60) Provisional application No. 62/452,988, filed on Feb. 1, 2017.

(51) Int. Cl.
*B23K 35/02* (2006.01)
*B22F 1/02* (2006.01)
(Continued)

(52) U.S. Cl.
CPC ............. *B23K 35/286* (2013.01); *B22F 1/02* (2013.01); *B22F 1/025* (2013.01);
(Continued)

(58) Field of Classification Search
None
See application file for complete search history.

(56) References Cited

U.S. PATENT DOCUMENTS

| 5,305,726 A | 4/1994 | Scharman et al. |
| 5,340,012 A | 8/1994 | Beeferman et al. |

(Continued)

FOREIGN PATENT DOCUMENTS

| JP | 2011054892 A | 3/2011 |
| JP | 5753304 B1 * | 7/2015 |

(Continued)

OTHER PUBLICATIONS

Choi et al., "Nanoparticle-Induced Superior Hot Tearing Resistance", Metallurgical and Materials Transactions, vol. 44A, 2013, p. 1897-1907 (Year: 2013).*

(Continued)

*Primary Examiner* — Devang R Patel
(74) *Attorney, Agent, or Firm* — O'Connor & Company

(57) ABSTRACT

A universal approach is described to produce welding filler materials with enhanced grain refining, for making welded objects with hot-crack resistance. Some variations provide a welding filler material comprising a functionalized metal-containing powder, wherein the functionalized metal-containing powder comprises metal or metal alloy particles and a plurality of nanoparticles disposed on surfaces of the metal or metal alloy particles, and wherein the nanoparticles are consolidated in a three-dimensional architecture throughout the welding filler material. A welded object contains a welding filler material comprising the functionalized metal-containing powder, enabling the welded object to be free of hot cracks. Other variations provide methods of making a welding filler material. This approach has been successfully demonstrated by incorporating zirconium-based nanoparticle grain refiners within a welding precursor material for welding aluminum alloy Al 7075, as one non-limiting example.

27 Claims, 7 Drawing Sheets

(51) Int. Cl.
  *B23K 35/28* (2006.01)
  *B23K 35/32* (2006.01)
  *B23K 35/36* (2006.01)
  *B23K 35/30* (2006.01)

(52) U.S. Cl.
  CPC ...... *B23K 35/0227* (2013.01); *B23K 35/0233* (2013.01); *B23K 35/0244* (2013.01); *B23K 35/284* (2013.01); *B23K 35/302* (2013.01); *B23K 35/3033* (2013.01); *B23K 35/3053* (2013.01); *B23K 35/325* (2013.01); *B23K 35/3601* (2013.01); *B23K 35/3602* (2013.01); *B23K 35/3606* (2013.01); *B22F 2998/10* (2013.01); *B22F 2999/00* (2013.01)

(56) References Cited

U.S. PATENT DOCUMENTS

| | | | |
|---|---|---|---|
| 5,462,712 | A | 10/1995 | Langan et al. |
| 6,024,915 | A | 2/2000 | Kume et al. |
| 6,071,628 | A | 6/2000 | Seals et al. |
| 6,254,757 | B1 | 7/2001 | Lashmore et al. |
| 6,368,427 | B1 | 4/2002 | Sigworth |
| 9,227,272 | B2 | 1/2016 | Li et al. |
| 9,238,877 | B2 | 1/2016 | Krause et al. |
| 9,682,445 | B1 * | 6/2017 | Chou ............... B23K 20/02 |
| 2002/0136884 | A1 | 9/2002 | Oechsner |
| 2003/0077473 | A1 | 4/2003 | Bretschneider et al. |
| 2003/0104147 | A1 | 6/2003 | Bretschneider et al. |
| 2005/0238528 | A1 | 10/2005 | Lin et al. |
| 2006/0065330 | A1 | 3/2006 | Cooper et al. |
| 2006/0196579 | A1 | 9/2006 | Skipor et al. |
| 2010/0288243 | A1 | 11/2010 | Kaburagi et al. |
| 2011/0127314 | A1 | 6/2011 | Heinrich et al. |
| 2012/0135142 | A1 | 5/2012 | Yang et al. |
| 2012/0315399 | A1 | 12/2012 | Feng et al. |
| 2013/0012643 | A1 | 1/2013 | Monsheimer et al. |
| 2013/0020377 | A1 | 1/2013 | Stankowski et al. |
| 2013/0146041 | A1 | 6/2013 | Hijii et al. |
| 2013/0152739 | A1 | 6/2013 | Li et al. |
| 2015/0252451 | A1 | 9/2015 | Al-Aqeeli et al. |
| 2015/0337423 | A1 | 11/2015 | Martin et al. |
| 2017/0016095 | A1 | 1/2017 | Karlen et al. |
| 2017/0252851 | A1 | 9/2017 | Fulop et al. |

FOREIGN PATENT DOCUMENTS

| | | |
|---|---|---|
| KR | 1020080105250 A | 12/2008 |
| WO | 2005017220 A1 | 2/2005 |

OTHER PUBLICATIONS

Chen et al., "Rapid control of phase growth by nanoparticles," Nature Communications 5:3879 DOI: 10.1038/ncomms4879.
Sheppard et al., "The Mechanochemical synthesis of magnesium hydride nanoparticles" Journal of Alloys and Compounds 492 (2010) L72-L74.
Zhu et al., "Growth Mechanism for the Controlled Synthesis of MgH2/Mg Crystals via a Vapor-Solid Process" Cryst. Growth Des. 2011, 11, 4166-4174.
Högberg et al., "Reactive sputtering of δ-ZrH2 thin films by high power impulse magnetron sputtering and direct current magnetron sputtering," Journal of Vacuum Science & Technology A 2014, 32, 041510.
Gharatloo et al., "Ultrasound-assisted synthesis of nano-structured zirconium hydride at room temperature," International Journal of Hydrogen Energy 40 (2015) 13942-13948.
Mukherjee et al., "Printability of alloys for additive manufacturing" Scientific Reports | 6:19717 | DOI: 10.1038/srep19717, Jan. 22, 2016.
He et al., "Alloying element vaporization during laser spot welding of stainless steel" J. Phys. D: Appl. Phys. 36 (2003) 3079-3088.
Bartkowiak et al., "New Developments of Laser Processing Aluminium Alloys via Additive Manufacturing Technique" Physics Procedia 12 (2011) 393-401.
Zhang et al., "Grain Refinement and Mechanical Properties of Cu—Cr—Zr Alloys with Different Nano-Sized TiCp Addition" Materials 2017, 10, 919; doi:10.3390/ma10080919.
Roberts et al., "A novel processing approach for additive manufacturing of commercial aluminum alloys" Physics Procedia 83 (2016) 909-917.
Martin et al., "3D printing of high-strength aluminium alloys" Nature, vol. 549, Sep. 21, 2017.

* cited by examiner

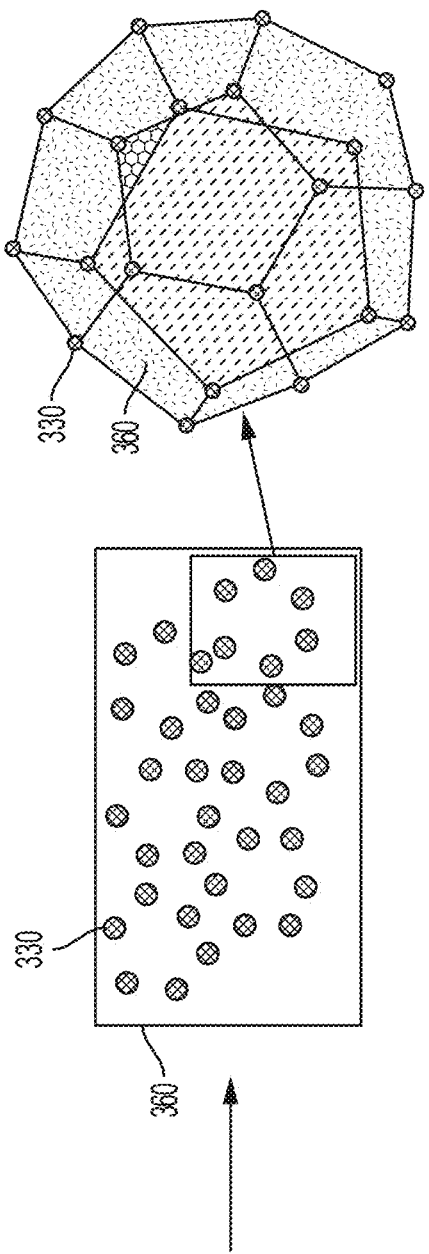
FIG. 3
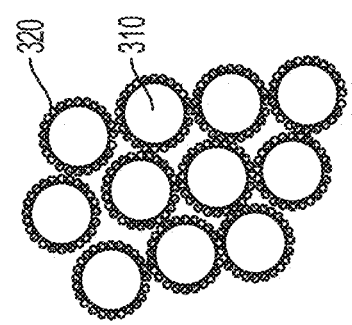

NANOPARTICLE COMPOSITE WELDING FILLER MATERIALS, AND METHODS FOR PRODUCING THE SAME

PRIORITY DATA

This patent application is a non-provisional application with priority to U.S. Provisional Patent App. No. 62/452,988, filed on Feb. 1, 2017, which is hereby incorporated by reference herein.

FIELD OF THE INVENTION

The present invention generally relates to welding rods or other welding materials, and methods of making and using the same.

BACKGROUND OF THE INVENTION

Welding is a fabrication process that joins materials, usually metals or thermoplastics, by causing fusion. Typically, a base metal is melted and a filler material is added to a joint to form a pool of molten material (the weld pool) that cools to form a joint. Pressure may also be used in conjunction with heat, or by itself, to produce a weld.

Some of the known welding methods include oxyacetylene welding; shielded metal arc welding (also known as stick welding or electric welding), which uses an electrode that slowly melts away; tungsten, inert gas (TIG) welding, which uses a non-consumable tungsten electrode to produce the weld; metal, inert gas (MIG) welding, which uses a wire feeding gun that feeds wire at an adjustable speed and flows an inert gas over the weld puddle to protect it from atmospheric contamination; submerged arc welding, which uses a consumable electrode and a blanket of granular fusible flux (flux shields the weld from atmospheric gases); electroslag welding, a single-pass welding process for thicker materials in a vertical position; electric resistance welding, a welding process in which heat to form the weld is generated by the electrical resistance of the material; laser welding, a welding technique used to join multiple pieces of metal through the use of a laser; and electron-beam welding, a fusion welding process in which a beam of high-velocity electrons is applied to two materials to be joined.

There are also solid-state welding processes such as friction welding in which metal does not melt. Friction stir welding is a solid-state joining process that uses a non-consumable tool to join two facing pieces without melting the material. Heat is generated by friction between the rotating tool and the material, which leads to a softened region near the welding tool. While the tool is traversed along the joint line, the tool mechanically intermixes the two pieces of metal and forges the hot and softened metal by mechanical pressure.

There are other joining techniques and forming processes, beyond welding. Welding is distinct from lower temperature metal-joining techniques such as brazing and soldering, which do not melt the base metal.

Welding and joining are extremely important engineering practices which provide low-cost, rapid assembly of geometrically complex components for a variety of applications. However, many high-performance alloys are limited in weldability or joinability due to hot-cracking susceptibility. Hot cracking refers to the formation of shrinkage cracks during the solidification of weld metal. Hot cracks generate strength-limiting defects within the final joined structure. Without the elimination of hot cracking, alloys will not achieve their full potential as a low-cost, high-strength option for engineering applications. There is a strong desire to eliminate hot cracks and other defects from the final microstructure of welded alloys.

The grain structure of the weld metal can affect significantly the properties of the resultant weld. Grain refinement can reduce the hot cracking experienced during the welding process. The reason is that fine equiaxed grains tend to reduce hot cracking and improve mechanical properties of the weld metal, such as toughness, ductility, strength, and fatigue life. Whereas there are acceptable limits for porosity and inclusions in welds, cracks are almost never acceptable.

Prior art suggests using a variety of different alloys more weldable than the targeted objects to be welded—however, this comes at the cost of material performance. Welding material performance often suffers from poor strength characteristics in comparison to the target welded structures, due to the inability to use high-performance materials as weld feedstock material. Previous approaches have incorporated nanoparticles in stir casting, but undesirably without a uniform distribution of reinforcement nanoparticles within the precursor material.

Modern welding techniques encompass a process in which formation of a metallurgical bond is facilitated through the melting and solidification of a filler material, usually a metal alloy. As the metal alloy is subjected to rapid heating, melting, and molten metal circulation, subsequent solidification of certain alloy systems can lead to crack formation as a result of interdendritic shrinkage. In welding techniques such as laser-beam welding and arc welding, the high cooling rates exacerbate solidification shrinkage and thermal tensions, which place the welded joint under large stress loads that ultimately prevent the production of a defect-free welded object. The current techniques follow a solidification path that is driven by thermal gradients. As a result, the final microstructure of the weld joint is columnar, which leads to anisotropic properties.

Another method of welding materials is to use off-composition filler metals. For aluminum alloys, these are usually high in silicon alloys, and for stainless steels these can be variations on other stainless steel compositions. The goal is to manipulate the composition of the weld pool to create a weldable metal in the joined area. This may be accomplished by shifting the solidification range as well as the composition and volume of interdendritic liquid. However, the resulting weld structure is generally a much weaker composition than the base material. As such, the weld must be designed to a lower peak stress than the rest of the component, to minimize the risk of weld failure (one of the most common failures in welded materials). In addition to that, shifting the composition induces a galvanic couple which can result in corrosion, even in stainless steel—ultimately limiting the effectiveness and quality of the welded part.

Limitations in cost, availability, and performance impede progress towards the successful welding of alloys across several industries. There is a need for a low-cost route to produce high-strength, high-performance welded joints. In particular, there is a need for a universal approach to producing welding and joining filler materials with enhanced grain refining and hot-crack resistance.

SUMMARY OF THE INVENTION

The present invention addresses the aforementioned needs in the art, as will now be summarized and then further described in detail below.

Some variations provide a welding filler material comprising a functionalized metal-containing powder, wherein the functionalized metal-containing powder comprises metal or metal alloy particles and a plurality of nanoparticles chemically and/or physically disposed on surfaces of the metal or metal alloy particles, and wherein the nanoparticles are consolidated in a three-dimensional architecture throughout the welding filler material.

In some embodiments, the metal or metal alloy particles contain an element selected from the group consisting of Al, Mg, Ni, Fe, Cu, Ti, V, Si, and combinations thereof. The metal or metal alloy particles optionally contain one or more additional alloying elements, other than Al, Mg, Ni, Fe, Cu, Ti, V, or Si.

The metal or metal alloy particles may include an aluminum alloy selected from the 2000 series of aluminum alloys, such as (but not limited to) aluminum alloy 2024, aluminum alloy 2219, or a combination thereof.

The metal or metal alloy particles may include an aluminum alloy selected from the 6000 series of aluminum alloys, such as (but not limited to) aluminum alloy 6061, aluminum alloy 6063, or a combination thereof.

The metal or metal alloy particles may include an aluminum alloy selected from the 7000 series of aluminum alloys, such as (but not limited to) aluminum alloy 7050, aluminum alloy 7075, or a combination thereof.

In some embodiments, the nanoparticles contain a compound selected from the group consisting of metals, intermetallic alloys, hydrides, oxides, nitrides, borides, carbides, carbon, and combinations thereof.

In certain embodiments, the metal or metal alloy particles include Zr, $ZrH_2$, or a combination thereof.

The welding filler material may contain from about 10 wt % to about 99.99 wt % of metal or metal alloy particles. The welding filler material may contain from about 0.01 wt % to about 10 wt % of nanoparticles, for example.

In some embodiments, the welding filler material contains a uniform concentration of nanoparticles. In other embodiments, the welding filler material contains a functionally graded concentration of nanoparticles across at least one dimension of the welding filler material. The metal or metal alloy particles and the nanoparticles may be disposed in a layered configuration within the welding filler material.

The metal or metal alloy particles may have an average particle size from about 1 micron to about 1 millimeter, for example. The nanoparticles may have an average nanoparticle size from about 1 nanometer to about 5000 nanometers, such as from about 10 nanometers to about 2000 nanometers, for example. A preferred size of nanoparticles is about 2000 nm or less, about 1500 nm or less, or about 1000 nm or less. In some embodiments, nanoparticles are at least 50 nm in size. The ratio of average particle size of the metal or metal alloy particles to average nanoparticle size of the nanoparticles may vary widely, such as from about 10 to about $10^5$.

The welding filler material may be in the form of a geometry selected from the group consisting of rods, wires, bars, plates, films, coils, spheres, cubes, prisms, cones, irregular shapes, and combinations thereof. In these or other embodiments, the welding filler material forms a welding electrode.

The welding filler material may be characterized by a volumetric density of at least 50% of theoretical, or at least 90% of theoretical (100% of theoretical would be the maximum material density in the absence of porosity or defects).

The present invention provides a welded object containing a welding filler material comprising a functionalized metal-containing powder, wherein the functionalized metal-containing powder comprises metal or metal alloy particles and a plurality of nanoparticles chemically and/or physically disposed on surfaces of the metal or metal alloy particles, and wherein the nanoparticles are consolidated in a three-dimensional architecture throughout the welding filler material. In certain embodiments, the welded object contains essentially no hot cracks.

Other variations of the invention provide a method of making a welding filler material, the method comprising:

(a) providing a precursor composition comprising metal-containing particles and nanoparticles, wherein the nanoparticles are chemically and/or physically disposed on surfaces of the particles; and (b) consolidating the precursor composition into a welding filler material comprising the metal-containing particles and the nanoparticles, wherein the nanoparticles are consolidated in a three-dimensional architecture throughout the welding filler material.

In some embodiments, step (b) includes pressing, extruding, binding, sintering, or a combination thereof.

The welding filler material may be fabricated to be in a geometric form selected from the group consisting of rods, wires, bars, plates, films, coils, spheres, cubes, prisms, cones, irregular shapes, and combinations thereof.

In some methods, step (b) produces a welding filler material that is characterized by a volumetric density of at least 50% of theoretical or at least 90% of theoretical.

The welding filler material produced from step (b) may contain a uniform concentration of nanoparticles, or may contain a functionally graded concentration of nanoparticles across at least one dimension of the welding filler material.

In some methods, the metal-containing particles contain an element selected from the group consisting of Al, Mg, Ni, Fe, Cu, Ti, V, Si, and combinations or alloys thereof. In these or other methods, the nanoparticles contain a compound selected from the group consisting of metals, intermetallic alloys, hydrides, oxides, nitrides, borides, carbides, carbon, and combinations thereof.

The present invention also provides a process of forming a welded object from multiple metal parts, the process comprising a disclosed method followed by welding together multiple metal parts, wherein the process includes introducing the disclosed welding filler material to a weld joint between the multiple metal parts. Preferably, the welded object contains essentially no hot cracks.

BRIEF DESCRIPTION OF THE DRAWINGS

FIG. 3 is a sketch depicting nanoparticles consolidated in a three-dimensional architecture throughout a welding filler material, in some embodiments.

DETAILED DESCRIPTION OF EMBODIMENTS OF THE INVENTION

Figure 1:
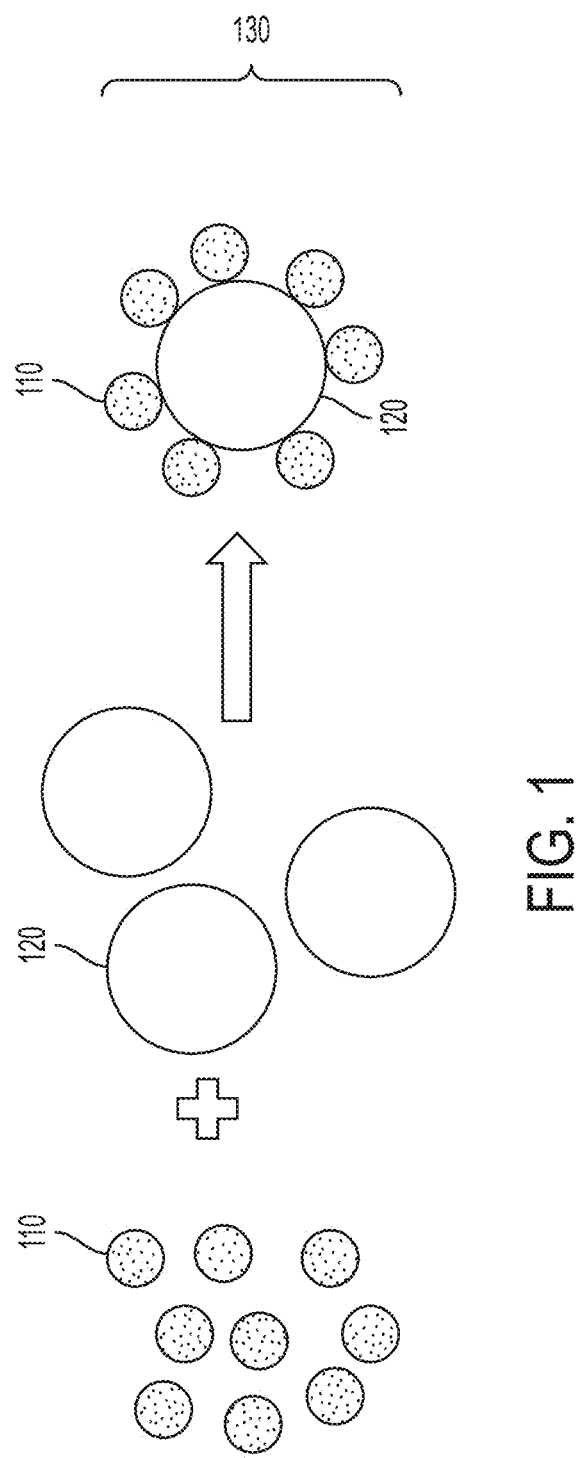
FIG. 1 is a sketch depicting preparation of a welding filler material powder, in some embodiments.

The compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

This invention is predicated, in part, on welding filler materials designed for high-strength, high-performance welding of metals and metal alloys. Variations of this invention enable the elimination of hot cracks from the final microstructure of welded metals and metal alloys through the implementation of a nanoparticle-reinforced metal alloy as the welding filler material. This welding filler material may be produced through powder extrusion of an alloy powder that is synthesized via incorporation of a dispersed nanoparticle reinforcement phase into a metal-containing powder.

Variations of the invention also provide methods of making welding filler materials, and methods of using welding filler materials. In addition to high strength and high performance, preferred welding filler materials are also relatively low cost in terms of the overall welding process. For example, the welding filler material may enhance the microstructure of the final welded product, thereby eliminating the need for material composition variance at the weld site.

The formation of defects from hot cracking within the microstructure of welded joints has heretofore been unavoidable due to the large grain size produced by current welding methods, such as metal arc welding, electron beam welding, and friction stir welding. The welding filler materials disclosed herein may be used in a grain-refinement technique to reduce or eliminate debilitating defects within welded joints that ultimately disrupt the performance of the final material. It has been determined that hot cracking is highly dependent on the size and geometry of grains present within the final microstructure of the metal or metal alloy. Therefore, by incorporating a welding filler material that encourages fine equiaxed grain growth, the challenges often confronted in current welding techniques can be circumvented.

The disclosed welding filler materials may be utilized to join traditionally unweldable materials. Also, such welding filler materials enable final geometries within a welded structure that would be otherwise unachievable.

Known structures joined through welding processes possess anisotropic properties due to grain growth being driven by thermal gradients within the melt pool. However, inclusion of a nanoparticle phase within the welding melt pool mitigates formation of this typical columnar grain microstructure and resulting anisotropic properties. Solidification during the welding process will no longer be solely dominated by thermal gradients, but also facilitated by additional nucleation sites induced by the nanoparticle phase within the welding filler materials. The disclosed nanoparticle precursors for welding filler materials therefore enable a reproducible method to fabricate final joints with isotropic properties across the entire structure. In some embodiments, the welding filler material has the same metal or metal alloy composition (except for the added nanoparticles) as the underlying base metal or metal alloy, enabling a final welded component without weaker weld joints and a low corrosion potential at the weld site.

Various embodiments provide a practical, low-cost route to produce high-strength, high-performance welded joints. The versatility of this invention leads to many industrial applications including, but not limited to, TIG welding, MIG welding, laser welding, friction stir welding, electron-beam welding, arc welding, general metal joining techniques, metal forming processes, and welding rework and repair.

Some embodiments of the present invention utilize materials, methods, and principles described in commonly owned U.S. patent application Ser. No. 15/209,903, filed Jul. 14, 2016, and/or commonly owned U.S. patent application Ser. No. 15/808,877, filed Nov. 9, 2017, each of which is hereby incorporated by reference herein. For example, certain embodiments utilize functionalized powder feedstocks as described in U.S. patent application Ser. No. 15/209,903.

The present disclosure is not limited to those functionalized powders. This specification also hereby incorporates by reference herein Martin et al., "3D printing of high-strength aluminium alloys" Nature vol. 549, pages 365-369 and supplemental online content (Extended Data), Sep. 21, 2017, in its entirety.

Some variations provide a welding filler material comprising a functionalized metal-containing powder, wherein the functionalized metal-containing powder comprises metal or metal alloy particles and a plurality of nanoparticles chemically and/or physically disposed on surfaces of the metal or metal alloy particles, and wherein the nanoparticles are consolidated in a three-dimensional architecture throughout the welding filler material (e.g., see FIG. 3). Refer below for further description of functionalized metal-containing powders that may be employed.

In some embodiments, the metal or metal alloy particles contain an element selected from the group consisting of Al, Mg, Ni, Fe, Cu, Ti, V, Si, and combinations thereof. Combinations of these elements may be alloys, intermetallic compounds, solid solutions, or multiphase solid mixtures, for example. Other alloying elements may be included in the metal or metal alloy particles, such as (but not limited to) H, Li, Be, B, C, N, O, F, Na, P, S, Cl, K, Ca, Sc, Cr, Mn, Fe, Co, Zn, Ga, Ge, As, Se, Br, Rb, Sr, Y, Zr, Nb, Mo, Tc, Ru, Rh, Pd, Ag, Cd, In, Sn, Te, I, Cs, Ba, Hf, Ta, W, Re, Os, Ir, Pt, Au, Hg, Pb, Bi, Tl, Ce, Nd, and combinations thereof.

In some embodiments, the nanoparticles contain a compound selected from the group consisting of metals, intermetallic compounds or alloys, hydrides, oxides, nitrides, borides, carbides, carbon, and combinations thereof. In certain embodiments, the nanoparticles contain a ceramic, a cermet, a polymer, or a combination thereof.

The metal or metal alloy particles may include an aluminum alloy selected from the 1000 series, 2000 series, 3000 series, 4000 series, 5000 series, 6000 series, 7000 series, 8000 series, or a combination thereof. Alternatively, or additionally, the metal or metal alloy particles may include an aluminum alloy selected from cast aluminum alloys.

The metal or metal alloy particles may include an aluminum alloy selected from the 2000 series of aluminum alloys. The 2000 series of aluminum alloys includes aluminum alloys 2011, 2014, 2024, 2036, 2048, 2055, 2090, 2091, 2099, 2124, 2195, 2218, 2219, 2319, and 2618. In certain embodiments, the metal or metal alloy particles include aluminum alloy 2024, aluminum alloy 2219, or a combination thereof.

The metal or metal alloy particles may include an aluminum alloy selected from the 6000 series of aluminum alloys. The 6000 series of aluminum alloys includes aluminum alloys 6005, 6009, 6010, 6060, 6061, 6063, 6063A, 6065, 6066, 6070, 6081, 6082, 6101, 6105, 6151, 6162, 6201, 6205, 6262, 6351, 6463, and 6951. In certain embodiments, the metal or metal alloy particles include aluminum alloy 6061, aluminum alloy 6063, or a combination thereof. In certain embodiments, the metal or metal alloy particles include aluminum alloy 6061 and the nanoparticles include $ZrH_x$ (x=0 to 4) or another zirconium-containing nanoparticle.

The metal or metal alloy particles may include an aluminum alloy selected from the 7000 series of aluminum alloys. The 7000 series of aluminum alloys includes aluminum alloys 7005, 7034, 7039, 7049, 7050, 7068, 7072, 7075, 7175, 7079, 7116, 7129, 7178, and 7475. In certain embodiments, the metal or metal alloy particles include aluminum alloy 7050, aluminum alloy 7075, or a combination thereof. In certain embodiments, the metal or metal alloy particles include aluminum alloy 7075 and the nanoparticles include $ZrH_x$ (x=0 to 4) or another zirconium-containing nanoparticle.

The welding filler material may contain from about 10 wt % to about 99.99 wt % of the metal or metal alloy particles. For example, the welding filler material may contain about 10, 15, 20, 25, 30, 40, 50, 60, 70, 80, or 90 wt % of the metal or metal alloy particles.

The welding filler material may contain from about 0.01 wt % to about 10 wt % of the nanoparticles, for example. For example, the welding filler material may contain about 0.05, 0.1, 0.2, 0.5, 1, 1.5, 2, 3, 4, 5, 6, 7, 8, 9, or 10 wt % of the nanoparticles, and preferably at least 0.1 wt %. On a volume basis, the welding filler material may contain from about 0.01 vol % to about 10 vol % of nanoparticles, and preferably at least 0.1 vol %, for example.

The welding filler material may include functionally graded nanoparticle configurations which can be optimized to ensure proper grain structure in the final welded joint. In some embodiments, the welding filler material contains a uniform concentration of nanoparticles. In other embodiments, the welding filler material contains a functionally graded concentration of nanoparticles across at least one dimension of the welding filler material, such as one or more regions of locally high nanoparticle density. The metal or metal alloy particles and the nanoparticles may be disposed in a layered configuration within the welding filler material.

The metal or metal alloy particles may have an average particle size from about 1 micron to about 1 millimeter, for example. In various embodiments, the metal or metal alloy particles have an average particle size of about 2, 5, 10, 25, 50, 100, 200, 300, 400, or 500 microns.

When nanoparticles are incorporated into the welding filler material, it may be referred to herein as a "nanoparticle composite welding filler material." The nanoparticles may have an average nanoparticle size from about 1 nanometer to about 5000 nanometers, such as from about 50 nanometers to about 2000 nanometers, for example. In various embodiments, the nanoparticles have an average nanoparticle size of about 10, 50, 100, 200, 300, 400, 500, 600, 700, 800, 900, 1000, 1500, 2000, 2500, 3000, 3500, or 4000 nanometers. In other embodiments, larger reinforcing microparticles are utilized (instead of, or in addition to, nanoparticles), with an average microparticle size from about 1 micron to about 5 microns, such as about 1.5, 2, 2.5, 3, 3.5, 4, or 4.5 microns.

The ratio of average particle size of the metal or metal alloy particles to average nanoparticle size of the nanoparticles may vary widely, such as from about 10 to about $10^5$. In various embodiments, the ratio of average particle size of the metal or metal alloy particles to average nanoparticle size of the nanoparticles is about, or at least about, 10, $10^2$, $10^3$, $10^4$, or higher. When microparticles are employed, the ratio of average particle size of the metal or metal alloy particles to average microparticle size of the microparticles may be less than 10.

In some embodiments, at least one nanoparticle is lattice-matched to within ±5% compared to a selected alloy for the welding filler material. Preferably, the nanoparticle is lattice-matched to within ±2%, more preferably to within ±0.5%, compared to a welding filler material metal or metal alloy without the nanoparticles.

In some embodiments, at least one nanoparticle is atomic density-matched to within ±25% compared to a selected alloy for the welding filler material. Preferably, the nanoparticle is atomic density-matched to within ±5%, more preferably to within ±0.5%, compared to a welding filler material metal or metal alloy without the nanoparticles.

Preferably, the welding filler material is compressed into a geometric material having a higher density than the density of the initial welding filler material. For example, the welding filler material may be further treated to form a geometry selected from the group consisting of rods, wires, bars, plates, films, coils, spheres, cubes, prisms, cones, irregular shapes, and combinations thereof. These geometries may have various sizes or ranges of sizes, such as lengths, widths, diameters, effective diameters, or thicknesses from about 0.01 to 100 inches, e.g. about 0.1 to about 25 inches. An exemplary welding filler rod is 14 inches long and 0.125 inch diameter, for illustration.

In some embodiments, the welding filler material forms a welding electrode. Welding electrodes are used in some welding techniques to melt metals at the welding point. Electrodes can be charged either positively or negatively. Welding electrodes may be either direct current or alternating current, and may be consumable or non-consumable electrodes. For example, electric current may be used to maintain an electric arc between a base metal material and a consumable electrode rod, which is made from a welding filler material disclosed herein. The welding filler material may be covered with a flux that protects the weld area from oxidation and contamination by producing carbon dioxide gas during the welding process. The electrode itself acts as filler, making a separate filler unnecessary, although optionally a separate welding filler material may also be employed. The weld region may be protected by some type of inert shielding gas.

The welding filler material may be characterized by a volumetric density of at least 50% of theoretical, or at least 90% of theoretical (100% of theoretical meaning the maximum material density in the absence of porosity or defects). In various embodiments, the welding filler material is characterized by a volumetric density of about 50%, 55%, 60%, 65%, 70%, 75%, 80%, 85%, 90%, 95%, 99%, or 100% of theoretical. The welding filler material may have a wide range of absolute densities, such as about 2, 3, 4, 5, 6, 7, 8, 9, 10, 11, 12, 13, 14, 15 g/cm$^3$ or greater.

The present invention provides a welded object containing a welding filler material comprising a functionalized metal-containing powder, wherein the functionalized metal-containing powder comprises metal or metal alloy particles and a plurality of nanoparticles chemically and/or physically disposed on surfaces of the metal or metal alloy particles, and wherein the nanoparticles are consolidated in a three-dimensional architecture throughout the welding filler material. In certain embodiments, the welded object contains essentially no hot cracks.

By "essentially no hot cracks" it is meant that at least 99.9 vol % of the welded material contains no linear or tortuous cracks that are greater than 0.1 microns in width and greater than 10 microns in length. In other words, to be considered a hot crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect.

Typically, a hot crack contains open space, which may be vacuum or may contain a gas such as air, $CO_2$, $N_2$, and/or Ar. A crack may also contain solid material different from the primary material phase of the welded object. These sorts of cracks containing material (other than gases) may be referred to as "inclusions." The non-desirable material disposed within the inclusion may itself contain a higher porosity than the bulk material, may contain a different crystalline (or amorphous) phase of solid, or may be a different material altogether, arising from impurities during fabrication, for example.

Porous voids may be present in a welded material. Preferably, at least 80 vol %, more preferably at least 90 vol %, even more preferably at least 95 vol %, and most preferably at least 99 vol % of the welded material contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the welded material contains no larger porous voids having an effective diameter of at least 5 microns. Typically, a porous void contains open space, which may be vacuum or may contain a gas such as air, $CO_2$, $N_2$, and/or Ar. For example, see the microstructure of FIG. 5 which contains porous voids (but contains no hot cracks).

Other variations of the invention provide a method of making a welding filler material, the method comprising:

(a) providing a precursor composition comprising metal-containing particles and nanoparticles, wherein the nanoparticles are chemically and/or physically disposed on surfaces of the particles; and (b) consolidating the precursor composition into a welding filler material comprising the metal-containing particles and the nanoparticles, wherein the nanoparticles are consolidated in a three-dimensional architecture throughout the welding filler material.

In some method embodiments, a functionalized powder (precursor composition) is produced, containing a base metal or metal alloy, and a selected grain-refining nanoparticle. The functionalized powder may then be shaped into an arbitrary geometrical configuration (rod, sphere, etc.) through a powder extrusion method. The powder extrusion may be driven by a high-powered cylindrical piston in order to achieve a dense or fully dense welding filler material.

In various embodiments, in step (b) consolidating includes pressing, extruding, binding, sintering, or a combination thereof. Conventional equipment may be employed for this step. Other techniques of compressing the precursor composition into a welding filler material may be utilized, as known to a skilled artisan.

The welding filler material may be fabricated to be in the form of a geometry selected from the group consisting of rods, wires, bars, plates, films, coils, spheres, cubes, prisms, cones, irregular shapes, and combinations thereof.

In some methods, in step (b), consolidating produces a welding filler material that is characterized by a volumetric density of at least 50% of theoretical or at least 90% of theoretical. In various embodiments, step (b) produces a welding filler material that is characterized by a volumetric density of about 50%, 55%, 60%, 65%, 70%, 75%, 80%, 85%, 90%, 95%, 99%, or 100% of theoretical.

The welding filler material produced from step (b) may contain a uniform concentration of nanoparticles, or may contain a graded concentration of nanoparticles across at least one dimension of the welding filler material. In some methods, the welding filler material is made to be graded with one or more regions that are locally dense with reinforcing nanoparticles, and other region(s) containing only the base metal or metal alloy.

In some methods, the metal-containing particles contain an element selected from the group consisting of Al, Mg, Ni, Fe, Cu, Ti, V, Si, and combinations thereof. Other alloying elements may also be included. In these or other methods, the nanoparticles contain a compound selected from the group consisting of metals, intermetallic alloys, hydrides, oxides, nitrides, borides, carbides, carbon, and combinations thereof.

The present invention also provides a process of forming a welded object from multiple metal parts, the process comprising a disclosed method of making a welding filler material, followed by welding together multiple metal parts. This process includes introducing the described welding filler material (in any form, such as a welding rod) to a weld joint between multiple metal parts.

Note that in certain embodiments, a welding filler material is used directly, without compression to a geometric shape. In these embodiments, a continuous, semi-continuous, or intermittent feed of welding filler material may be applied to one or more weld joints or regions.

Many different energy sources may be employed for welding, including a gas flame, an electric arc, a laser, an electron beam, friction, and/or ultrasound. Welding may be performed in many different environments, including in open air, under water, and in outer space. Welding may be carried out in combination with any number of other material processing techniques, including (but not limited to) thermal, chemical, mechanical, or ornamental treatments. Such other processing steps may be done before, during, or after welding. Weld joints may vary widely in dimensions, and a multitude of final welded objects are possible. Preferably, the final welded object contains essentially no hot cracks.

Some embodiments can be understood by reference to FIGS. 1, 2A, 2B, and 2C. Like numerals following the first digit denote like elements, so that for instance elements 110 and 210 are the same elements shown in different drawings.

FIG. 1 is a sketch depicting preparation of a welding filler material powder. In FIG. 1, nanoparticles 110 and metal or metal alloy particles 120 are mixed together, optionally dissolved or suspended in a solvent, such as water or tetrahydrofuran (THF). Nanoparticles 110 are stabilized on the surface of metal or metal alloy particles 120 through electrostatic forces, Van der Waals forces, chemical bonds, physical bonds, and/or any other force—forming a functionalized powder 130 that comprises nanoparticles 110 disposed on surfaces of metal or metal alloy particles 120.

Figure 2A:
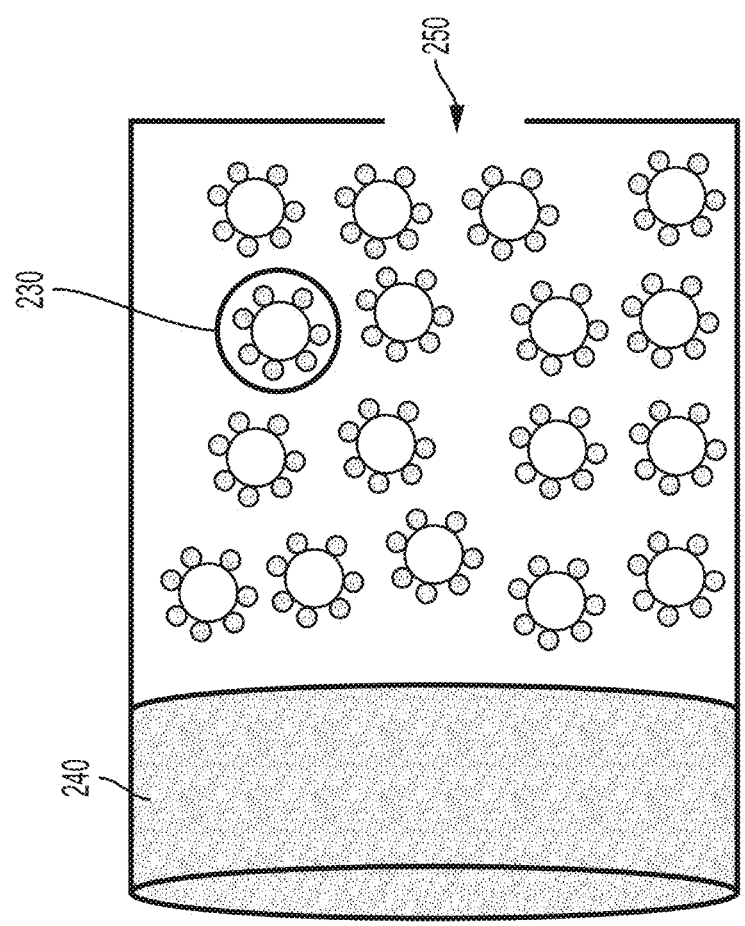
FIG. 2A is a sketch depicting preparation of a welding filler material from a functionalized powder, in some embodiments.

FIG. 2A is a sketch depicting preparation of a welding filler material from a functionalized powder 230 (equivalent to functionalized powder 130 of FIG. 1). In FIG. 2A, the functionalized powder 230 is shaped into an arbitrary geometrical configuration through powder extrusion, as an exemplary consolidation technique. A pressing piston 240 compresses functionalized powder 230 through an opening 250. The opening 250 may be geometrically configured based on the desired shape of the welding filler material, which may be (but is not limited to) a rod, a wire, a plate, a sphere, a cube, a prism, or another arbitrary shape.

Figure 2B:
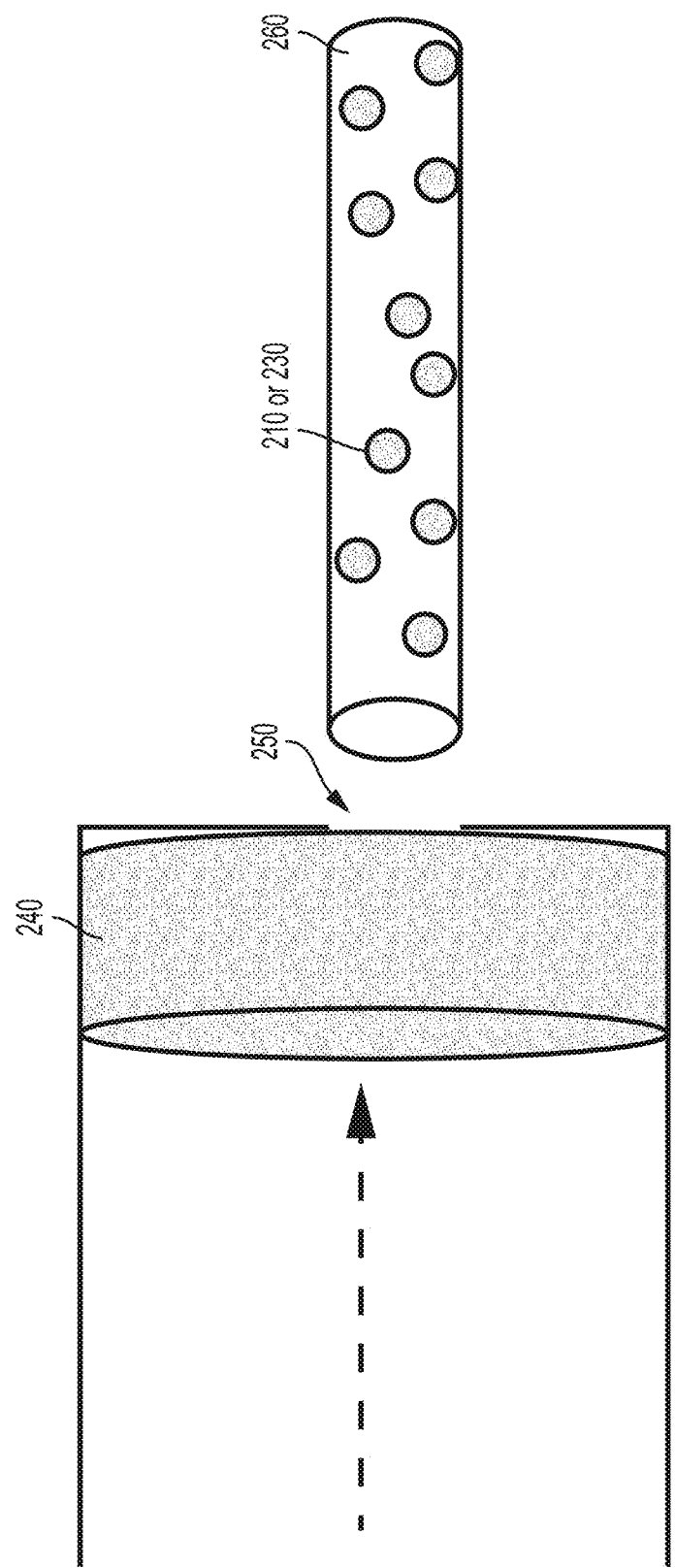
FIG. 2B is a sketch depicting the formation of a welding filler material in the shape of a rod, which contains metal or metal alloy and nanoparticles, in certain embodiments.

FIG. 2B is a sketch depicting the formation of a welding filler material in the shape of a rod, for illustration purposes. The rod contains metal or metal alloy 260, which is derived from metal or metal alloy particles 120, and unreacted nanoparticles 210 and/or functionalized powder particles 230.

Figure 2C:
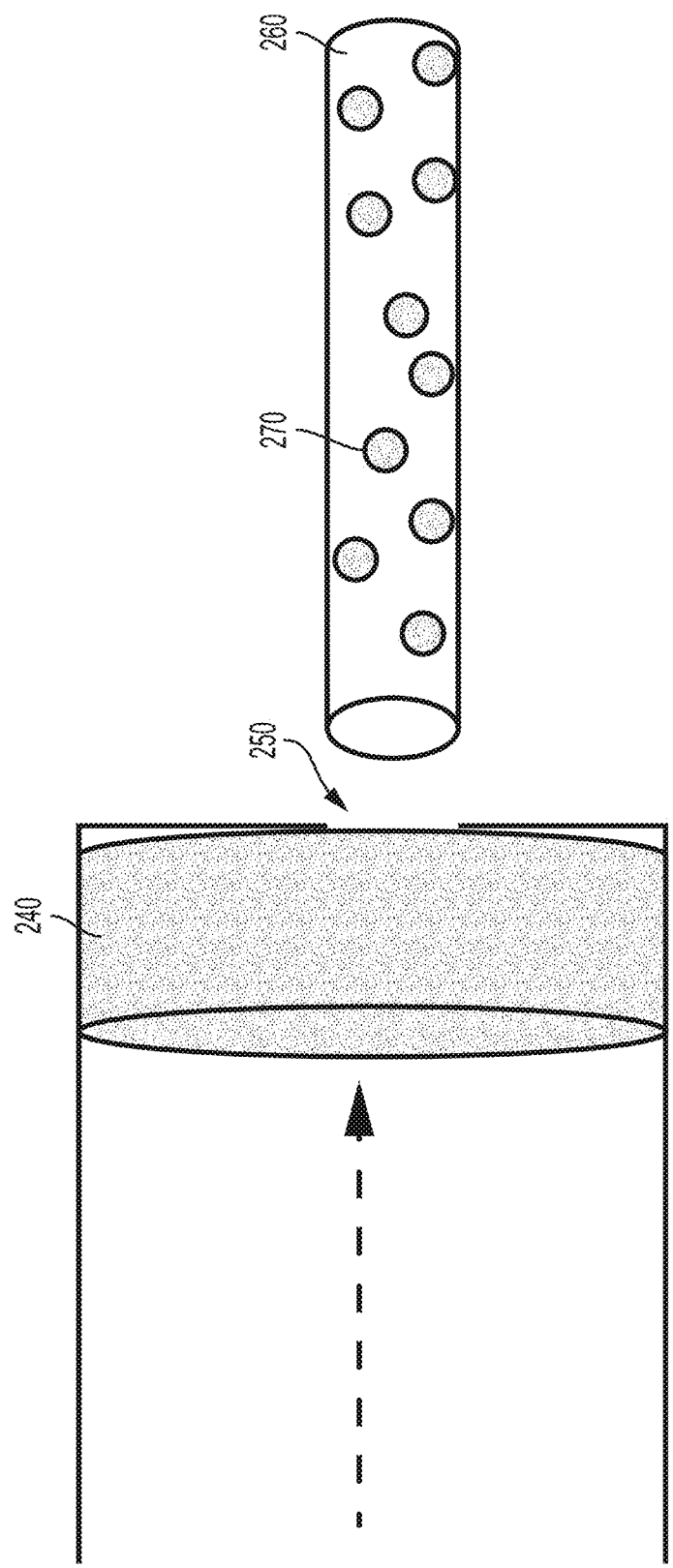
FIG. 2C is a sketch depicting the formation of a welding filler material in the shape of a rod, which contains metal or metal alloy and reacted nanoparticles, in certain embodiments.

FIG. 2C is a sketch depicting the formation of a welding filler material in the shape of a rod, which contains metal or metal alloy 260 and reacted nanoparticles 270 (i.e. initial nanoparticles 110 in FIG. 1 react to form new nanoparticles 270 in FIG. 2C).

Functionalized feedstocks for producing welding filler materials may be powder feedstocks. As intended herein, "powder feedstocks" refers to any powdered ceramic, metal, polymer, glass, composite, or combination thereof. In some embodiments, the powder feedstocks are metals or metal-containing compounds. Powder particle sizes are typically between about 1 micron and about 1 mm, but in some cases could be as much as about 1 cm.

The powdered feedstock may be in any form in which discrete particles can be reasonably distinguished from the bulk. The powder may be present as loose powders, a paste, a suspension, or a green body, for example. A green body is an object whose main constituent is weakly bound powder material, before it has been melted and solidified. For instance, a green body could be a welding filler rod. A filler rod as a welding filler material may consist of the powder feedstock compressed into a usable rod.

Particles may be solid, hollow, or a combination thereof. Particles can be made by any means including, for example, gas atomization, milling, cryomilling, wire explosion, laser ablation, electrical-discharge machining, or other techniques known in the art. The powder particles may be characterized by an average aspect ratio from about 1:1 to about 100:1. The "aspect ratio" means the ratio of particle length to width, expressed as length:width. A perfect sphere has an aspect ratio of 1:1. For a particle of arbitrary geometry, the length is taken to be the maximum effective diameter and the width is taken to be the minimum effective diameter.

In some embodiments, the particles themselves (within the welding filler material) are in the shape of rod-shaped particles or domains resembling long sticks, dowels, or needles. The average diameter of the rod-shaped particles or domains may be selected from about 5 nanometers to about 100 microns, for example. Rods need not be perfect cylinders, i.e. the axis is not necessarily straight and the diameter is not necessarily a perfect circle. In the case of geometrically imperfect cylinders (i.e. not exactly a straight axis or a round diameter), the aspect ratio is the actual axial length, along its line of curvature, divided by the effective diameter, which is the diameter of a circle having the same area as the average cross-sectional area of the actual nanorod shape.

The powder material particles may be anisotropic. As meant herein, "anisotropic" particles have at least one chemical or physical property that is directionally dependent. When measured along different axes, an anisotropic particle will have some variation in a measurable property. The property may be physical (e.g., geometrical) or chemical in nature, or both. The property that varies along multiple axes may simply be the presence of mass; for example, a perfect sphere would be geometrically isotropic while a cylinder is geometrically anisotropic. The amount of variation of a chemical or physical property may be 5%, 10%, 20%, 30%, 40%, 50%, 75%, 100% or more.

"Solidification" generally refers to the phase change from a liquid to a solid. In some embodiments, solidification refers to a phase change within the entirety of the powder volume. In other embodiments, solidification refers to a phase change at the surface of the particles or within a fractional volume of the powder material. In various embodiments, at least (by volume) 1%, 2%, 5%, 10%, 15%, 20%, 25%, 30%, 40%, 50%, 60%, 70%, 80%, 90%, 95%, 99%, or 100% of the powdered material is melted to form the liquid state.

For a metal or mixtures of metals, solidification generally results in one or more solid metal phases that are typically crystalline, but sometimes amorphous. Ceramics also may undergo crystalline solidification or amorphous solidification. Metals and ceramics may form an amorphous region coinciding with a crystalline region (e.g., in semicrystalline materials). In the case of certain polymers and glasses, solidification may not result in a crystalline solidification. In the event of formation of an amorphous solid from a liquid, solidification refers to a transition of the liquid from above the glass-transition temperature to an amorphous solid at or below the glass-transition temperature. The glass-transition temperature is not always well-defined, and sometimes is characterized by a range of temperatures.

"Surface functionalization" refers to a surface modification on the powdered materials (e.g., as functionalized powder 130 in FIG. 1), which modification significantly affects the solidification behavior (e.g., solidification rate, yield, selectivity, heat release, etc.) of the powder materials. In various embodiments, a powdered material is functionalized with about 1%, 2%, 5%, 10%, 15%, 20%, 25%, 30%, 40%, 50%, 60%, 70%, 80%, 85%, 90%, 95%, 99%, or 100% of the surface area of the powdered material having the surface-functionalization modifications. The surface modification maybe a surface-chemistry modification, a physical surface modification, or a combination thereof.

In some embodiments, the surface functionalization includes a nanoparticle coating and/or a microparticle coating. The nanoparticles and/or microparticles may include a metal, ceramic, polymer, or carbon, or a composite or combination thereof. The surface functionalization may include nanoparticles that are chemically or physically disposed on the surface of the powder materials.

Nanoparticles or microparticles may be attached to the surface of other microparticles using electrostatic forces, Van der Waals forces, chemical bonds, mechanical bonds, and/or any other force. A chemical bond is the force that holds atoms together in a molecule or compound. Electrostatic and Van der Waals forces are examples of physical forces that can cause bonding. A mechanical bond is a bond that arises when molecular entities become entangled in space. Typically, chemical bonds are stronger than physical bonds.

The nanoparticles or microparticles are typically a different composition than the base powder. Nanoparticles or microparticles may include metals, hydrides, carbides, nitrides, borides, oxides, intermetallics, or other materials which upon processing form one or more of the aforementioned materials. In some preferred embodiments, nanoparticles are less than 250 nm in average size.

Due to the small size of nanoparticles, benefits may be possible with less than 1% surface area coverage. In the case of functionalization with a nanoparticle of the same composition as the base powder, a surface-chemistry change may not be detectable and can be characterized by topological differences on the surface, for example. Functionalization with a nanoparticle of the same composition as the base powder may be useful to reduce the melting point in order to initiate sintering at a lower temperature, for example.

In some embodiments, microparticles coat micropowders or macropowders, which are precursors to welding filler materials. The micropowder or macropowder particles may include ceramic, metal, polymer, glass, or combinations thereof. The microparticles (coating) may include metal, ceramic, polymer, carbon, or combinations thereof. In the case of microparticles coating other micropowders or macropowders, functionalization preferably means that the coating particles are of significantly different dimension(s) than the base powder. For example, the microparticles may be characterized by an average dimension (e.g., diameter) that is less than 20%, 10%, 5%, 2%, or 1% of the largest dimension of the coated powders.

In some embodiments, microparticle surface functionalization is in the form of a continuous coating or an intermittent coating. A continuous coating covers at least 90% of the surface, such as about 95%, 99%, or 100% of the surface (recognizing there may be defects, voids, or impurities at the surface). An intermittent coating is non-continuous and covers less than 90%, such as about 80%, 70%, 60%, 50%, 40%, 30%, 20%, 10%, 5%, 2%, 1%, or less of the surface. An intermittent coating may be uniform (e.g., having a certain repeating pattern on the surface) or non-uniform (e.g., random).

In general, the coating may be continuous or discontinuous. The coating may have several characteristic features. In one embodiment, the coating may be smooth and conformal to the underlying surface. In another embodiment, the coating may be nodular. The nodular growth is characteristic of kinetic limitations of nucleation and growth. For example, the coating may look like cauliflower or a small fractal growing from the surface. These features can be affected by the underling materials, the method of coating, reaction conditions, etc.

A coating (functionalizing the microparticle surface) may or may not be in the form of nanoparticles or microparticles. That is, the coating may be derived from nanoparticles or microparticles, while discrete nanoparticles or microparticles may no longer be present. Various coating techniques may be employed, such as (but not limited to) electroless deposition, immersion deposition, or solution coating. The coating thickness is preferably less than about 20% of the underlying particle diameter, such as less than 15%, 10%, 5%, 2%, or 1% of the underlying particle diameter.

In some embodiments, the surface functionalization also includes direct chemical or physical modification of the surface of the powder materials, such as to enhance the bonding of the nanoparticles or microparticles. Direct chemical modification of the surface of the powder materials, such as addition of molecules, may also be utilized to affect the solidification behavior of the powder materials. A plurality of surface modifications described herein may be used simultaneously.

Nanoparticles are particles with the largest dimension between about 1 nm and 5000 nm. Microparticles are particles with the largest dimension between about 1 micron and 1000 microns. The nanoparticle or microparticle size may be selected based on the desired properties and final function of the assembly.

Nanoparticles or microparticles may be spherical or of arbitrary shape with the largest dimension typically not exceeding the above largest dimensions. An exception is structures with extremely high aspect ratios, such as carbon nanotubes in which the dimensions may include up to 100 microns in length but less than 100 nm in diameter. The nanoparticles or microparticles may include a coating of one or more layers of a different material. Mixtures of nanoparticles and microparticles may be used. In some embodiments, microparticles themselves are coated with nanoparticles, and the microparticle/nanoparticle composite is incorporated as a coating or layer on the powder material particles.

In some embodiments, the nanoparticles and/or microparticles are selected to control solidification of a portion of the powdered material, such as a region of powdered material for which solidification control is desired. Other regions containing conventional powdered materials, without nanoparticles and/or microparticles, may be present. In some embodiments, the nanoparticles and/or microparticles are selected to control solidification of a portion of each the particles (e.g., less than the entire volume of a particle, such as an outer shell).

Various material combinations are possible. In some embodiments, the powder particles are ceramic and the nanoparticles and/or microparticles are ceramic. In some embodiments, the powder particles are ceramic and the nanoparticles and/or microparticles are metallic. In some embodiments, the powder particles are polymeric and the nanoparticles and/or microparticles are metallic, ceramic, or carbon-based. In some embodiments, the powder particles are glass and the nanoparticles and/or microparticles are metallic. In some embodiments, the powder particles are glass and the nanoparticles and/or microparticles are ceramic. In some embodiments, the powder particles are ceramic or glass and the nanoparticles and/or microparticles are polymeric or carbon-based, and so on.

Exemplary ceramic materials for the powders, or the nanoparticles and/or microparticles, include (but are not limited to) SiC, HfC, TaC, ZrC, NbC, WC, TiC, $TiC_{0.7}N_{0.3}$, VC, $B_4C$, $TiB_2$, $HfB_2$, $TaB_2$, $ZrB_2$, $WB_2$, $NbB_2$, TaN, HfN, BN, ZrN, TiN, NbN, VN, $Si_3N_4$, $Al_2O_3$, $MgAl_2O_4$, $HfO_2$, $ZrO_2$, $Ta_2O_5$, $TiO_2$, $SiO_2$, and oxides of rare-earth elements Y, La, Ce, Pr, Nd, Sm, Eu, Gd, Tb, Dy, Ho Er, Tm, Yb, and/or Lu.

Exemplary metallic materials for the powders, or the nanoparticles and/or microparticles, include (but are not limited to) Sc, Ti, V, Cr, Y, Zr, Nb, Mo, Ru, Rh, Pd, La, Ce, Pr, Nd, Sm, Eu, Gd, Tb, Dy, Ho Er, Tm, Yb, Lu, Ta, W, Re, Os, Ir, Pt, Si, or B.

Exemplary polymer materials for the powders, or the nanoparticles and/or microparticles, include (but are not limited to) thermoplastic organic or inorganic polymers, or thermoset organic or inorganic polymers. Polymers may be natural or synthetic.

Exemplary glass materials for the powders include (but are not limited to) silicate glasses, porcelains, glassy carbon, polymer thermoplastics, metallic alloys, ionic liquids in a glassy state, ionic melts, and molecular liquids in a glassy state.

Exemplary carbon or carbon-based materials for the nanoparticles and/or microparticles include (but are not limited to) graphite, activated carbon, graphene, carbon fibers, carbon nanostructures (e.g., carbon nanotubes), and diamond (e.g., nanodiamonds).

These categories of materials are not mutually exclusive; for example a given material may be metallic/ceramic, a ceramic glass, a polymeric glass, etc.

The selection of the coating/powder composition will be dependent on the desired properties and should be considered on a case-by-case basis. Someone skilled in the art of material science or metallurgy will be able to select the appropriate materials for the intended process, based on the information provided in this disclosure. The processing and final product configuration should also be dependent on the desired properties. Someone skilled in the art of material science, metallurgy, and/or mechanical engineering will be able to select the appropriate processing conditions for the desired outcome, based on the information provided in this disclosure.

In some embodiments, a method of controlling solidification of a powdered material comprises:

providing a powdered material comprising a plurality of particles, wherein the particles are fabricated from a first material, and wherein each of the particles has a particle surface area that is surface-functionalized with nanoparticles and/or microparticles;

melting at least a portion of the powdered material to a liquid state; and semi-passively controlling solidification of the powdered material from the liquid state to a solid state.

As intended in this description, "semi-passive control," "semi-passively controlling," and like terminology refer to control of solidification during heating, cooling, or both heating and cooling of the surface-functionalized powder materials, wherein the solidification control is designed prior to melting through selected functionalization and is not actively controlled externally once the melt-solidification process has begun. Note that external interaction is not necessarily avoided. In some embodiments, semi-passive control of solidification further includes selecting the atmosphere (e.g., pressure, humidity, or gas composition), temperature, or thermal input or output. These factors as well as other factors known to someone skilled in the art may or may not be included in semi-passive control.

Exemplary semi-passive control processes, enabled through surface functionalization as described herein, will now be illustrated.

One route to control nucleation is the introduction, into the liquid phase, of nanoparticles derived from a coating described above. The nanoparticles may include any material composition described above and may be selected based on their ability to wet into the melt. Upon melt initiation, the nanoparticles wet into the melt pool as dispersed particles which, upon cooling, serve as nucleation sites, thereby producing a fine-grained structure with observable nucleation sites in the cross-section. In some embodiments, the density of nucleation sites is increased, which may increase the volumetric freezing rate due to the number of growing solidification fronts and the lack of a nucleation energy barrier.

In an exemplary embodiment, ceramic nanoparticles, e.g. $TiB_2$ or $Al_2O_3$ nanoparticles, are coated onto aluminum alloy microparticles. The ceramic nanoparticles are introduced into an aluminum alloy melt pool in an additive manufacturing process. The nanoparticles then disperse in the melt pool and act as nucleation sites for the solid. The additional well-dispersed nucleation sites can mitigate shrinkage cracks (hot cracking). Shrinkage cracks typically occur when liquid cannot reach certain regions due to blockage of narrow channels between solidifying grains. An increase in nucleation sites can prevent formation of long, narrow channels between solidifying grains, because multiple small grains are growing, instead of few large grains.

In another exemplary embodiment, nanoparticles act as nucleation sites for a secondary phase in an alloy. The nanoparticles may comprise the secondary phase or a material that nucleates the secondary phase (due to similar crystal structures, for instance). This embodiment can be beneficial if the secondary phase is responsible for blocking interdendritic channels leading to hot cracking. By nucleating many small grains of the secondary phase, a large grain that might block the narrow channel between the dendrites can be avoided. Furthermore, this embodiment can be beneficial if the secondary phase tends to form a continuous phase between the grains of the primary phase, which promotes stress corrosion cracking. By providing additional nucleation sites for the secondary phase, this secondary phase may be broken up and interdispersed, preventing it from forming a continuous phase between grains of the primary alloy. By breaking up a secondary phase during solidification, there is the potential to more completely homogenize the material during heat treatment, which can decrease the likelihood of stress corrosion cracking (fewer gradients in the homogenized material). If the secondary phase is not continuous, long notches from corrosion are less likely.

In another embodiment of nucleation control, the functionalized surface may fully or partially dissolve in the melt and undergo a reaction with materials in the melt to form precipitates or inclusions, which may act in the same manner as the nanoparticles in the preceding paragraph. For example, titanium particles may be coated on an aluminum alloy particle, which upon melting would dissolve the titanium. However, on cooling the material undergoes a reaction, forming aluminum-titanium intermetallic ($Al_3Ti$) inclusions which would serve as nucleation sites.

In another embodiment, the coating may react with impurities to form nucleation sites. An example is a magnesium coating on a titanium alloy powder. Titanium has a very high solubility of oxygen (a common atmospheric contaminant), which can affect the overall properties. A coating of magnesium reacts within the melt, binding to dissolved oxygen which forms magnesium oxide (MgO) inclusions, promoting nucleation.

Nucleation control may include the use of ceramic particles. In some embodiments, the ceramic particles can be wet by the molten material, while in other embodiments, the ceramic particles cannot be wet by the molten material. The ceramic particles may be miscible or immiscible with the molten state. The ceramic particles may be incorporated into the final solid material. In some embodiments, the ceramic particles are rejected from the solid. Exemplary ceramic materials include (but are not limited to) SiC, HfC, TaC, ZrC, NbC, WC, TiC, $TiC_{0.7}N_{0.3}$, VC, $B_4C$, $TiB_2$, $HfB_2$, $TaB_2$, $ZrB_2$, $WB_2$, $NbB_2$, TaN, HfN, BN, ZrN, TiN, NbN, VN, $Si_3N_4$, $Al_2O_3$, $MgAl_2O_3$, $HfO_2$, $ZrO_2$, $Ta_2O_5$, $TiO_2$, $SiO_2$, and oxides of rare-earth elements Y, La, Ce, Pr, Nd, Sm, Eu, Gd, Tb, Dy, Ho Er, Tm, Yb, and/or Lu.

Nucleation control may include the use of metallic particles. In some embodiments, the metallic particles can be wet by the molten material. The metallic particles may form an alloy with the molten material through a eutectic reaction or peritectic reaction. The alloy may be an intermetallic compound or a solid solution. In some embodiments, the metallic particles cannot be wet by the molten material and cannot form an alloy with the molten material. Exemplary metallic materials include (but are not limited to) Sc, Ti, V, Cr, Y, Zr, Nb, Mo, Ru, Rh, Pd, La, Ce, Pr, Nd, Sm, Eu, Gd, Tb, Dy, Ho Er, Tm, Yb, Lu, Ta, W, Re, Os, Ir, Pt, Si, or B.

Nanoparticles promote surface growth of crystals that have crystallographic matching. Nucleation on the surface of a nanoparticle is more likely when there is good fit (crystallographic matching) between the crystal lattice parameters of the nanoparticles and the solidifying material. Nanoparticles may be selected to promote nucleation of a specific phase in the melt.

Generally, nucleation-promoting chemical reactions are dependent on the selected surface functionalization and on the heating (or cooling) parameters.

As nanoparticles or microparticles are organized on a particle surface under conditions for which rapid melting or near melting occurs and rapidly fuses the particles together with very little melt convection, the coating will not have the time or associated energy to diffuse away from its initial position relative to the other powders. This would in turn create a three-dimensional network structure of inclusions. Thus, a method is provided to control maximum grain size and/or to design a predictable microstructure. The microstructure is dependent on the initial powder size, shape, and packing configuration/density. Adjusting the coating and powder parameters allows control of this hierarchical structure. In some embodiments, these architectures significantly improve material properties by impeding, blocking, or redirecting dislocation motion in specific directions, thereby reducing or eliminating failure mechanisms.

Utilizing the appropriate functionalization, the heat flow during solidification may be controlled using heats of fusion or vaporization. In some embodiments, inclusions are pulled into the melt or reacted within the melt (as described above). In some embodiments, a coating is rejected to the surface of the melt pool. Utilizing a functionalization surface with a high vapor pressure at the desired melting point of the powder, vaporization would occur, resulting in a cooling effect in the melt which increases the freezing rate. As described above, magnesium on a titanium alloy may accomplish this, in addition to forming oxide inclusions. The effect of this is detectible when comparing non-functionalized powders to functionalized powders under identical conditions, as well as comparing the composition of feed material versus the composition of the final product.

In another embodiment, the opposite effect occurs. Some systems may require slower solidification times than can be reasonably provided in a certain production system. In this instance, a higher-melting-point material, which may for example be rejected to the surface, freezes. This releases the heat of fusion into the system, slowing the total heat flux out of the melt. Heat may also be held in the melt to slow solidification by incorporating a secondary material with a significantly higher heat capacity.

In another embodiment, the heat of formation is used to control heat flow during melt pool formation and/or solidification. For example, nickel microparticles may be decorated with aluminum nanoparticles. Upon supply of enough activation energy, the exothermic reaction of Ni and Al to NiAl is triggered. In this case, a large heat of formation is released (−62 kJ/mol) which may aid in melting the particles fully or partially. The resulting NiAl intermetallic is absorbed into the melt and stays suspended as a solid (a portion may be dissolved) due to its higher melting point, thereby acting as a nucleation site as well as having a strengthening effect on the alloy later.

Thermodynamic control of solidification may utilize nanoparticle or microparticle surface coatings which undergo a phase transformation that is different from phase transformations in the base material. The phase transformations may occur at different solidus and/or liquidus temperatures, at similar solidus and/or liquidus temperatures, or at the same solidus and/or liquidus temperatures. The phase-transformed nanoparticles/microparticles or surface coatings may be incorporated into the final solid material, or may be rejected from the final solid material, or both of these. The phase-transformed nanoparticles/microparticles or surface coatings may be miscible or immiscible with the molten state. The phase-transformed nanoparticles/microparticles or surface coatings may be miscible or immiscible with the solid state.

Thermodynamic control of solidification may utilize nanoparticles/microparticles or surface coatings which vaporize or partially vaporize. For example, such coatings may comprise organic materials (e.g., waxes, carboxylic acids, etc.) or inorganic salts (e.g., $MgBr_2$, $ZnBr_2$, etc.).

Thermodynamic control of solidification may utilize nanoparticles/microparticles or surface coatings which release or absorb gas (e.g., oxygen, hydrogen, carbon dioxide, etc.).

Thermodynamic control of solidification may utilize nanoparticle or microparticle surface coatings with different heat capacities than the base material. The welding filler material comprising a functionalized metal-containing powder, described herein, can overcome known welding problems caused by significantly different heat capacities between the base system and the filler material, otherwise leading to poor performance.

In addition to controlling the energy within the system, it also is possible to control the rate at which heat leaves the system by controlling thermal conductivity or emissivity (thermal IR radiation). This type of control may be derived from a rejection to the surface or from the thermal conductivity of a powder bed during additive manufacturing, for instance. In one embodiment, the functionalization may reject to the surface a low-conductivity material, which may be the functionalization material directly or a reaction product thereof, which insulates the underlying melt and decreases the freezing rate. In other embodiments, a layer may have a high/low emissivity which would increase/decrease the radiative heat flow into or out of the system. These embodiments are particularly applicable in electron-beam systems which are under vacuum and therefore radiation is a primary heat-flow mechanism.

Additionally, in laser welding systems, the emissivity of a rejected layer may be used to control the amount of energy input to the powder bed for a given wavelength of laser radiation. In another embodiment, the functionalized surface may be fully absorbed in the melt yet the proximity to other non-melted functionalized powders, such as additive manufacturing in a powder bed, may change the heat conduction out of the system. This may manifest itself as a low-thermal-conductivity base powder with a high-conductivity coating.

Thermal conductivity or emissivity control of solidification may utilize nanoparticle or microparticle surface coatings which are higher in thermal conductivity compared to the base material. The nanoparticle or microparticle surface coatings may be incorporated into the melt, or may be rejected, such as to grain boundaries or to the surface of the melt. The nanoparticle or microparticle surface coatings may be miscible or immiscible with the molten state and/or with the final solid state.

Thermal conductivity or emissivity control of solidification may utilize nanoparticle or microparticle surface coatings which are lower in thermal conductivity compared to the base material.

Thermal conductivity or emissivity control of solidification may utilize nanoparticle or microparticle surface coatings which are higher in emissivity compared to the base material.

Thermal conductivity or emissivity control of solidification may utilize nanoparticle or microparticle surface coatings which are lower in emissivity compared to the base material.

In some embodiments, the functionalization material may react with contaminants in the melt (e.g., Mg—Ti—O system). When the functionalization material is properly chosen, the reacted material may be selected such that the formed reaction product has a high surface tension with the liquid, such that it may be rejected to the surface. The rejected reaction product may take the form of an easily removable scale. Optionally, the rejected layer is not actually removed but rather incorporated into the final product. The rejected layer may manifest itself as a hard-facing carbide, nitride, or oxide coating, a soft anti-galling material, or any other functional surface which may improve the desired properties of the produced material. In some cases, the rejected surface layer may be of a composition and undergo a cooling regime which may result in an amorphous layer on the surface of the solidified material. These surface-rejected structures may result in improved properties related to, but not limited to, improved corrosion resistance, stress corrosion crack resistance, crack initiation resistance, overall strength, wear resistance, emissivity, reflectivity, and magnetic susceptibility.

Through contaminant removal or rejection, several scenarios are possible. Nanoparticles/microparticles or surface coatings that react with or bind to undesired contaminants may be incorporated into the solidification, in the same phase or a separate solid phase. The reacted nanoparticle or microparticle surface coatings may be rejected during solidification. When portions or select elements present in the nanoparticle or microparticle surface coatings react with or bind to contaminants, such portions or elements may be incorporated and/or rejected.

In some embodiments, the solid state of a welding filler material is a three-dimensional microstructure containing the nanoparticles and/or microparticles as inclusions distributed throughout the solid state. For example, see FIG. 3. In some embodiments, the solid state of a welding filler material is a layered microstructure containing one or more layers comprising the nanoparticles and/or microparticles.

The method may further include creating a structure through one or more techniques selected from the group consisting of additive manufacturing, injection molding, pressing and sintering, capacitive discharge sintering, and spark plasma sintering. The present invention provides a solid welding filler material, comprising a structure produced using such a method.

Some variations provide a welding filler material structure created from the functionalized powder via additive manufacturing. The functionalized powder (with nanoparticle or microparticle surface coating) may be incorporated into the final structure. In some embodiments, the nanoparticle or microparticle surface coating is rejected, creating a scale. The scale may be unbonded to the structure. In some embodiments, the scale bonds to the structure or otherwise cannot be readily removed. This may be advantageous, such as to provide a structural enhancement—for instance, rejected ceramic particles may add a hard facing to the final structure. A rejected nanoparticle or microparticle surface coating may form a multilayer composite, wherein each layer has a different composition. In some embodiments, a rejected nanoparticle or microparticle surface coating forms a spatially graded composition within the bulk of the structure. A three-dimensional architecture may also develop in the final microstructure.

Some variations provide a solid welding filler material comprising at least one solid phase (i) containing a powdered material as described, or (ii) derived from a liquid form of a powdered material as described. The solid phase may form from 0.25 wt % to 100 wt % of the solid, such as about 1 wt %, 5 wt %, 10 wt %, 25 wt %, 50 wt %, or 75 wt % of the solid, for example.

Other variations provide a solid welding filler material comprising a continuous solid phase and a three-dimensional network of nanoparticle and/or microparticle inclusions distributed throughout the continuous solid phase, wherein the three-dimensional network blocks, impedes, or redirects dislocation motion within the solid welding filler material.

In some embodiments, nanoparticle and/or microparticle inclusions are distributed uniformly throughout the continuous solid phase of the welding filler material. The nanoparticle and/or microparticle inclusions may be present at a concentration from about 0.1 wt % to about 50 wt % of the solid, such as about 1, 2, 5, 10, 15, 20, 25, 30, 35, 40, or 45 wt %, for example.

In some embodiments, light elements are incorporated into the welding filler material or into the final parts being welded. For example, the particle surface (or the surface of nanoparticles or microparticles present on the powder particles) may be surface-reacted with an element selected from the group consisting of hydrogen, oxygen, carbon, nitrogen, boron, sulfur, and combinations thereof, or essentially any other element(s) as desired. For example, reaction with hydrogen gas may be carried out to form a metal hydride. Optionally, the particle or a particle coating further contains a salt, carbon, an organic additive, an inorganic additive, or a combination thereof. Certain embodiments utilize relatively inert carbides that are incorporated (such as into steel) with fast melting and solidification.

Some possible powder consolidation techniques that may be used include, but are not limited to, hot pressing, low-pressure sintering, extrusion, metal injection molding, additive manufacturing, electron-beam melting, selective laser sintering, pressureless sintering, and combinations thereof.

The final welding filler material may have porosity from 0% to about 75%, such as about 5%, 10%, 20%, 30%, 40%, 50%, 60%, or 70%, in various embodiments. The porosity may derive from space both within particles (e.g., hollow shapes) as well as space outside and between particles. The total porosity accounts for both sources of porosity.

The final welding filler material may be selected from the group consisting of a sintered structure, a coating, a geometric object, a billet, an ingot, a net-shape part, a near-net-shape part, and combinations thereof. The welding filler material may be produced from the coated reactive metal by a process comprising one or more techniques selected from the group consisting of hot pressing, cold pressing, sintering, extrusion, injection molding, additive manufacturing, electron-beam melting, selective laser sintering, pressureless sintering, and combinations thereof.

In some embodiments of the invention, the coated particles are fused together to form a continuous or semi-continuous material. As intended in this specification, "fused" should be interpreted broadly to mean any manner in which particles are bonded, joined, coalesced, or otherwise combined, at least in part, together. Many known techniques may be employed for fusing together particles.

In various embodiments, fusing is accomplished by sintering, heat treatment, pressure treatment, combined heat/pressure treatment, electrical treatment, electromagnetic treatment, melting/solidifying, contact (cold) welding, solution combustion synthesis, self-propagating high-temperature synthesis, solid state metathesis, or a combination thereof.

"Sintering" should be broadly construed to mean a method of forming a solid mass of material by heat and/or pressure without melting the entire mass to the point of liquefaction. The atoms in the materials diffuse across the boundaries of the particles, fusing the particles together and creating one solid piece. The sintering temperature is typically less than the melting point of the material. In some embodiments, liquid-state sintering is used, in which some but not all of the volume is in a liquid state.

When sintering or another heat treatment is utilized, the heat or energy may be provided by electrical current, electromagnetic energy, chemical reactions (including formation of ionic or covalent bonds), electrochemical reactions, pressure, or combinations thereof. Heat may be provided for initiating chemical reactions (e.g., to overcome activation energy), for enhancing reaction kinetics, for shifting reaction equilibrium states, or for adjusting reaction network distribution states.

A sintering technique may be selected from the group consisting of radiant heating, induction, spark plasma sintering, microwave heating, capacitor discharge sintering, and combinations thereof. Sintering may be conducted in the presence of a gas, such as air or an inert gas (e.g., Ar, He, or $CO_2$), or in a reducing atmosphere (e.g., $H_2$ or CO). Various sintering temperatures or ranges of temperatures may be employed. A sintering temperature may be about, or less than about, 100° C., 200° C., 300° C., 400° C., 500° C., 600° C., 700° C., 800° C., 900° C., or 1000° C. A sintering temperature is preferably less than the reactive-metal melting temperature. In some embodiments, a sintering temperature may be less than a maximum alloy melting temperature, and further may be less than a minimum alloy melting temperature. In certain embodiments, the sintering temperature may be within the range of melting points for a selected alloy. In some embodiments, a sintering temperature may be less than a eutectic melting temperature of the particle alloy.

At a peritectic decomposition temperature, rather than melting, a metal alloy decomposes into another solid compound and a liquid. In some embodiments, a sintering temperature may be less than a peritectic decomposition temperature of the metal alloy. If there are multiple eutectic melting or peritectic decomposition temperatures, a sintering temperature may be less than all of these critical temperatures, in some embodiments.

In some embodiments pertaining to aluminum alloys employed in the microparticles, the sintering temperature is preferably selected to be less than about 450° C., 460° C., 470° C., 480° C., 490° C., or 500° C. The decomposition temperature of eutectic aluminum alloys is typically in the range of 400-600° C. (Belov et al., *Multicomponent Phase Diagrams: Applications for Commercial Aluminum Alloys*, Elsevier, 2005), which is hereby incorporated by reference herein.

Some variations produce or employ metal matrix nanocomposites as part of, or all of, a welding filler material. A "metal matrix nanocomposite" is a metal-containing material with greater than 0.1 wt % nanoparticles distributed in a metal matrix or otherwise within the metal-containing material.

Some embodiments produce or employ a functionally graded nanocomposite welding filler material. As intended herein, a "functionally graded nanocomposite welding filler material" is a welding filler material that exhibits a spatial gradient of one or more properties, derived from some spatial variation, within the metal matrix, of a nanoparticle or nanoparticle phase.

Functionally graded nanocomposite welding filler materials may be produced with arbitrary composition and with control of nanoparticle volume fraction. Starting with functionalized feedstocks as described above, a low or high volume fraction of nanoparticles may be achieved. There may be a uniform or non-uniform distribution of nanoparticles within the matrix, by utilizing conventional, low-cost powder metallurgy approaches and ingot processing.

Some variations provide a metal matrix nanocomposite composition comprising metal-containing microparticles and nanoparticles, wherein the nanoparticles are chemically and/or physically disposed on surfaces of the microparticles, and wherein the nanoparticles are consolidated in a three-dimensional architecture throughout the composition.

A "three-dimensional architecture" means that the nanoparticles are not randomly distributed throughout the metal matrix nanocomposite. Rather, in a three-dimensional architecture of nanoparticles, there is some regularity in spacing between nanoparticles, in space (three dimensions). The average spacing between nanoparticles may vary, such as from about 1 nanoparticle diameter to about 100 nanoparticle diameters or more, depending on the nanoparticle concentration in the material.

In some embodiments, the three-dimensional architecture of nanoparticles in the metal matrix nanocomposite is correlated to the distribution of nanoparticles within the starting composition (functional microparticles, i.e. metal-containing microparticles with nanoparticles on surfaces). Such a three-dimensional architecture of nanoparticles is possible when the kinetics during melting and solidification are controlled such that the integrity and dispersion of nanoparticles are preserved.

FIG. 3 depicts some embodiments in which a functionalized powder containing microparticles 310 coated with nanoparticles 320 is consolidated into a welding filler material of arbitrary shape (rectangular in this drawing), such as by application of heat and pressure, containing nanoparticles 330 distributed throughout a metal or metal alloy phase 360. The welding filler material maintains a three-dimensional architecture of nanoparticles 330 uniformly distributed throughout the metal or metal alloy matrix 360. As shown in the zoomed-in portion of the welding filler material (right-hand side of FIG. 3), the nanoparticles 330 are oriented in a three-dimensional structure within the metal or metal alloy matrix 360. In some embodiments, the three-dimensional structure is predictable based on the starting material (i.e. the functionalized powder containing microparticles 310 coated with nanoparticles 320). That is, the dimensions of microparticles 310 and nanoparticles 320, and the spacing between individual microparticles 310 as well as between individual nanoparticles 320, can be correlated to the spacing (in three dimensions) between individual nanoparticles 330 within the metal or metal alloy matrix 360 in the welding filler material.

In some embodiments, the nanoparticles do not melt and do not significantly disperse from the original dispositions, relative to each other, following melting of the metal matrix and then during solidification. In certain embodiments, the nanoparticles melt, soften (such as to become a glass), or form a liquid-solution solution, yet do not significantly disperse from the original dispositions, relative to each other, following melting of the metal matrix and/or during solidification. When such nanoparticles resolidify (or undergo a phase transition) during solidification of the melt, they assume their original dispositions or approximate coordinates thereof. In some embodiments, whether or not the nanoparticles melt, the nanoparticles end up in a three-dimensional architecture in which the locations of nanoparticles are different than the original dispositions, but may be correlated and therefore predictable based on the starting functionalized feedstock.

In some embodiments, an ingot is made or obtained, for later producing a welding filler material, or as the welding filler material. An "ingot" or equivalently "pre-dispersed ingot" means a raw material that contains both a metal component and a pre-dispersed reinforcing nanoparticle component. An ingot may be obtained after processing of a functionalized powder, or after processing of a metal matrix nanocomposite. In some embodiments, the ingot already contains a functional gradient of nanoparticle density. In some embodiments, the ingot has or contains a microstructure indicative of a material which consisted of powder precursors with nanoparticle surface functionalization. This will result in a 3D network of nanoparticles in the ingot.

An ingot may be a green body or a finished body. Ingot relative densities may range from 10% to 100%, for example, calculated as a percentage of the theoretical density (free of voids) of the components contained in the ingot.

The use of the ingot may vary. Further processing may result in the redistribution of nanoparticles throughout the structure. The ingot may be processed in such a way that it has the distinct advantage of containing a targeted volume fraction of nanoparticles determined during functionalization and a uniform distribution due to the discrete nanoparticle assembly on the surface of the metal-containing microparticles.

The microparticles may contain an element selected from the group consisting of Al, Mg, Ni, Fe, Cu, Ti, V, Si, and combinations thereof, for example. Additional alloying elements may be included beyond Al, Mg, Ni, Fe, Cu, Ti, V, and Si. The nanoparticles may contain a compound selected from the group consisting of metals, ceramics, cermets, intermetallic alloys, oxides, carbides, nitrides, borides, polymers, carbon, and combinations thereof, for example. In certain embodiments, the microparticles contain Al, Si, and Mg (e.g., alloy AlSi10Mg), and the nanoparticles contain tungsten carbide (WC).

Some variations provide a method of making a welding filler material, the method comprising:

(a) providing a precursor composition comprising metal-containing microparticles and nanoparticles, wherein the nanoparticles are chemically and/or physically disposed on surfaces of the microparticles;

(b) consolidating the precursor composition into an intermediate composition comprising the metal-containing microparticles and the nanoparticles, wherein the nanoparticles are consolidated in a three-dimensional architecture throughout the intermediate composition; and (c) processing the intermediate composition to convert the intermediate composition into a welding filler material.

In some embodiments, the precursor composition is in powder form. In some embodiments, the intermediate composition is in ingot form.

The microparticles may contain an element selected from the group consisting of Al, Mg, Ni, Fe, Cu, Ti, V, Si, and combinations thereof. The nanoparticles may contain a compound selected from the group consisting of metals, ceramics, cermets, intermetallic alloys, oxides, carbides, nitrides, borides, polymers, carbon, and combinations thereof. Typically, the compositions of the microparticles and nanoparticles are different, although it is possible for the chemical composition to be the same or similar while there are differences in physical properties (particle size, phases, etc.).

The composition may contain from about 10 wt % to about 99.9 wt % of microparticles. In these or other embodiments, the composition contains from about 0.1 wt % to about 10 wt % of nanoparticles. Higher concentrations of nanoparticles are possible, particularly when regions with lower concentration are physically removed (as discussed later). A composition may be identified as a "cermet" when metal content is low, such as 20 wt % or less.

In some embodiments, at least 1% of the surface area of the microparticles contains nanoparticles that are chemically and/or physically disposed on the microparticle surfaces. When higher nanoparticle concentrations are desired in the final material, it is preferred that a higher surface area of the microparticles contains nanoparticles. In various embodiments, at least 1%, 2%, 5%, 10%, 20%, 30%, 40%, 50%, 60%, 70%, 80%, 90%, or 95% of the total surface area of the microparticles contains nanoparticles that are chemically and/or physically disposed on the microparticle surfaces.

In some embodiments, the microparticles have an average microparticle size from about 1 micron to about 1 centimeter. In various embodiments, the average microparticle size is about 5 microns, 10 microns, 50 microns, 100 microns, 200 microns, 500 microns, 1 millimeter, 5 millimeters, or 10 millimeters. The nanoparticles have an average nanoparticle size from about 1 nanometer to about 5000 nanometers.

In some embodiments, the metal matrix has a density from about 2 $g/cm^3$ to about 10 $g/cm^3$. In some embodiments, the nanoparticles independently have a density from about 1 $g/cm^3$ to about 20 $g/cm^3$.

In various embodiments, consolidating in step (b) includes pressing, binding, sintering, or a combination thereof. Consolidating may alternatively or additionally include metal injection molding, extruding, isostatic pressing, powder forging, spray forming, metal additive manufacturing, and/or other known techniques. The intermediate composition produced by step (b) may be referred to as a green body.

In various embodiments, processing in step (c) includes pressing, sintering, mixing, dispersing, friction stir welding, extrusion, binding (such as with a polymer binder), melting, semi-solid melting, sintering, casting, or a combination thereof. Melting may include induction melting, resistive melting, skull melting, arc melting, laser melting, electron beam melting, semi-solid melting, or other types of melting (including convention and non-conventional melt processing techniques). Casting may include centrifugal, pour, or gravity casting, for example. Sintering may include spark discharge, capacitive-discharge, resistive, or furnace sintering, for example. Mixing may include convection, diffusion, shear mixing, or ultrasonic mixing, for example.

Steps (b) and (c) collectively convert the precursor composition (e.g., the functionalized powder) into a green body or a finished body which may then be used as a welding filler material, or for additional post processing.

In some embodiments, the metal-matrix phase and the first reinforcement phase are each dispersed throughout the nanocomposite. In these or other embodiments, the metal-matrix phase and the first reinforcement phase are disposed in a layered configuration within the nanocomposite, wherein the layered configuration includes at least a first layer comprising the nanoparticles and at least a second layer comprising the metal-matrix phase.

The final welding filler material may have a cast microstructure, in some embodiments. By a "cast microstructure" it is meant that the metal matrix nanocomposite is characterized by a plurality of dendrites and grain boundaries within the microstructure. In some embodiments, there is also a plurality of voids, but preferably no cracks or large phase boundaries. A dendrite is a characteristic tree-like structure of crystals produced by faster growth of crystals along energetically favorable crystallographic directions as molten metal freezes.

Note that while casting is a metal processing technique, a cast microstructure is a structural feature, not necessarily tied to any particular process to make the microstructure. A cast microstructure can certainly result from freezing (solidification) of molten metal or metal alloy. However, metal solidification can result in other microstructures, and cast microstructures can arise from other metal-forming techniques. Metal processes that do not rely at all on melting and solidification (e.g., forming processes) will not tend to produce a cast microstructure.

A cast microstructure can generally be characterized by primary dendrite spacing, secondary dendrite spacing, dendritic chemical segregation profile, grain size, shrinkage porosity (if any), percent of secondary phases, composition of secondary phases, and dendritic/equiaxed transition, for example.

In some embodiments of the present invention, a cast microstructure is further characterized by an equiaxed, fine-grained microstructure. A microstructure that has "equiaxed grains" means that at least 90 vol %, preferably at least 95 vol %, and more preferably at least 99 vol % of the microstructure contains grains that are roughly equal in length, width, and height. In a metal alloy, crystals of metal alloy form grains in the solid. Each grain is a distinct crystal with its own orientation. The areas between grains are known as grain boundaries. Within each grain, the individual atoms form a crystalline lattice. In this disclosure, equiaxed grains result when there are many nucleation sites arising from grain-refining nanoparticles contained in the microstructure.

In some embodiments of the present invention, a cast microstructure is further characterized by a dispersed microstructure. A dispersed microstructure generally arises from the large number of dendrites and grain boundaries within the microstructure, which in turn arise from the large number of nanoparticles on surfaces of microparticles. The degree of dispersion may be characterized by a dispersion length scale, calculated as the average spacing between nanoparticles and/or the average length scale in the metal phase between nanoparticles. In various embodiments, the dispersion length scale is from about 1 nanometer to about 100 microns, such as from about 10 nanometers to about 10 microns, or about 100 nanometers to about 1 micron.

Optionally, porosity may be removed or reduced in a cast microstructure. For example, a secondary heat and/or pressure (or other mechanical force) treatment may be done to minimize porous voids present in the welding filler material. Also, pores may be removed from the welding filler material by physically removing (e.g., cutting away) a region into which porous voids have segregated, such as via density-driven phase segregation.

In addition to removal of voids, other post-working may be carried out, potentially resulting in other final microstructures that are not cast microstructures, or that contain a mixture of microstructures. For example, forging can refine defects from cast ingots or continuous cast bar, and can introduce additional directional strength, if desired. Pre-working (e.g., strain hardening) can be done such as to produce a grain flow oriented in directions requiring maximum strength. The final microstructure therefore may be a forged microstructure, or a mixed cast/forged microstructure, in certain embodiments. In various embodiments, the welding filler material, on a volume basis, is at least 10%, 25%, 50%, 75%, 90%, 95%, 99%, or 100% cast microstructure.

Some embodiments produce a master alloy as part of, or all of, a welding filler material. A "master alloy" is well-defined in the art and refers to a concentrated alloy source which can be added to a metal being processed, to introduce the appropriate alloying elements into the system. Master alloys are particularly useful when the alloying elements are difficult to disperse or in low weight quantities. In the case of the dispersion difficulties, pre-dispersed master alloys increase wetting and avoid agglomeration. In the case of low quantities, it is much easier to control additions when heavier weights of pre-alloyed material can be added, to avoid weighing errors for the minor alloying elements. Use of a master alloy within a welding filler material allows, for example, tailored compositions at weld joints, when desired.

A "master alloy welding filler material" herein means a welding filler material with greater than 0.1 wt % nanoparticles distributed in a metal or metal alloy matrix, suitable for further processing through a variety of different routes (melt processing, machining, forging, etc.) into a final product. The concentration of nanoparticles is typically at least 1 wt %.

In some variations of the invention, a functionally graded welding filler material is fabricated, followed by removal of one or more phases not containing nanoparticles (or containing a lower concentration of nanoparticles) from the nanocomposite, to generate a master alloy welding filler material.

The production of a master alloy welding filler material allows for a high volume loading of reinforcement phases into metal matrices. By consolidating a homogenously dispersed nanoparticle reinforcement phase, such as via density-driven phase separation, and then removing a portion that does not contain the nanoparticle reinforcement phase, a master alloy is obtained. The master alloy may be used in further processing to produce a final geometrical configuration, such as in melt processing and casting.

These methods provide low-cost, high-volume production of master alloy welding filler materials with high volume loading of nanoparticulate reinforcement. Reaction times may be minimized by using a pre-dispersed feedstock powder or feedstock ingot.

Some variations provide a method of making a master alloy welding filler material, the method comprising:

(a) providing an ingot composition comprising metal-containing microparticles and nanoparticles, wherein the nanoparticles are chemically and/or physically disposed on surfaces of the microparticles, and wherein the nanoparticles are consolidated in a three-dimensional architecture throughout the ingot composition;

(b) melting the ingot composition to form a melt, wherein the melt segregates into a first phase comprising the metal-containing microparticles and a second phase comprising the nanoparticles;

(c) solidifying the melt to obtain a welding filler material with a gradient in concentration of the nanoparticles through at least one dimension; and (d) optionally removing a fraction of the welding filler material containing a lower concentration of the nanoparticles compared to the remainder of the welding filler material, thereby producing a master alloy welding filler material.

The microparticles may contain an element selected from the group consisting of Al, Mg, Ni, Fe, Cu, Ti, V, Si, and combinations thereof. The nanoparticles may contain a compound selected from the group consisting of metals, ceramics, cermets, intermetallic alloys, oxides, carbides, nitrides, borides, polymers, carbon, and combinations thereof. In certain embodiments, the microparticles contain Al, Si, and Mg, and the nanoparticles contain tungsten carbide (WC).

Step (b) may further include pressing, sintering, mixing, dispersing, friction stir welding, extrusion, binding, capacitive discharge sintering, casting, or a combination thereof. Step (b) may include holding the melt for an effective dwell time (e.g., about 1 minute to 8 hours) to cause density-driven segregation of the first phase from the second phase. Optionally, step (b) may include exposing the melt to an external force selected from gravitational, centrifugal, mechanical, electromagnetic, or a combination thereof.

Step (c) may include directional solidification or progressive solidification of the melt, if desired. Directional solidification is solidification that occurs from the farthest end of the casting and works its way towards the passage through which liquid material is introduced into a mold. Progressive solidification is solidification that starts at the walls of the casting and progresses perpendicularly from that surface.

In some embodiments, the metal-matrix phase and the first reinforcement phase are each dispersed throughout the welding filler material. In these or other embodiments, the metal-matrix phase and the first reinforcement phase are disposed in a layered configuration within the welding filler material, wherein the layered configuration includes at least a first layer comprising the nanoparticles and at least a second layer comprising the metal-matrix phase.

Step (d) may include includes machining, ablation, reaction, dissolution, evaporation, selective melting, or a combination thereof. In certain embodiments, step (d) provides two distinct master alloy welding filler materials. A number of heating methods and dwell times are appropriate for the production of density-driven master alloy welding filler materials.

In some embodiments, a method of fabrication of a master alloy welding filler material starts by using a pre-dispersed ingot as a raw material with a metal component and a reinforcing particulate. This ingot is taken to a liquid or a semi-solid phase through processing, wherein the metal component enters a molten liquid or semi-solid phase with a dispersed reinforcing component (nanoparticles).

The reinforcing component segregates through density-driven segregation, in some embodiments. In particular, the matrix is solidified and the reinforcing component is separated by density into one or more higher-volume fractions (compared to the matrix). The low-volume fraction component of the whole solid is then removed, at least partially, to leave behind a final product of a high-volume fraction master alloy welding filler material.

Compositions of this master alloy vary widely, according to selection of the matrix metal(s) and/or metal alloy(s) in combination with nanoparticles of arbitrary composition, including other metals or metal alloys. Reinforcing nanoparticles are preferably less than 5000 nm in size, more preferably less than 2000 nm, with any geometrical configuration (rod, sphere, prism, etc.). Note that the removed low-density material may be recycled and used in subsequent processing. By producing a master alloy which may be added to a targeted alloy system in the molten state, fully dispersed welding filler materials may be created and later processed under conventional, cost-effective pyro-metallurgy approaches.

The welding filler material may ultimately be processed by a variety of processes. Metal-part forming operations include, but are not limited to, welding, forging, rolling, extrusion, drawing, sand casting, die casting, investment casting, powder metallurgy, additive manufacturing, or others. A cast microstructure may be desired in the final welding filler material, or a different microstructure may be desired, such as a forged microstructure. A cast microstructure for the welding filler material may be preferred for the performance and quality of a welding filler material, in some embodiments.

EXAMPLE

The effectiveness of this invention (in some variations) is demonstrated in a multipass laser-welded system with aluminum alloy Al 7075 powder as the precursor material combined with ZrH$_2$ nanoparticles.

Aluminum alloy 7075 micropowder is purchased from Valimet Inc. (Stockton, Calif., U.S.). The powder consists of Al (balance), Zn (5.40%), Mg (2.25%), Cu (1.54%), Cr (0.19%), Fe (0.17%), Si (0.13%), Mn (0.02%), and Ti (<0.01%), in weight percent. The particle-size distribution is bimodal with peak values at 45 µm and 15 µm. Hydrogen-stabilized zirconium (ZrH$_2$ powder) is purchased from US Research Nanomaterials Inc. (Houston, Tex., U.S.).

Laser welding is performed on a Concept Laser (Grapevine, Tex., U.S.) M2 selective laser melting machine with single-mode, CW modulated ytterbium fiber laser (1070 nm, 400 W), scan speed up to 7.9 m/s, spot size 50 µm minimum. Powder handling parameters: 80 mm×80 mm build chamber size, 70 mm×70 mm build plate size, 20-80 µm layer thickness. The atmosphere is Ar or N$_2$, <0.1% O$_2$. Processing is done under a flowing, inert argon atmosphere with oxygen monitoring. All processing is completed at room temperature with no applied heat. Samples are removed from the machine and cleaned of extra powder by sonicating in water. Parts are then dried with clean, compressed, dry air.

Figure 4:
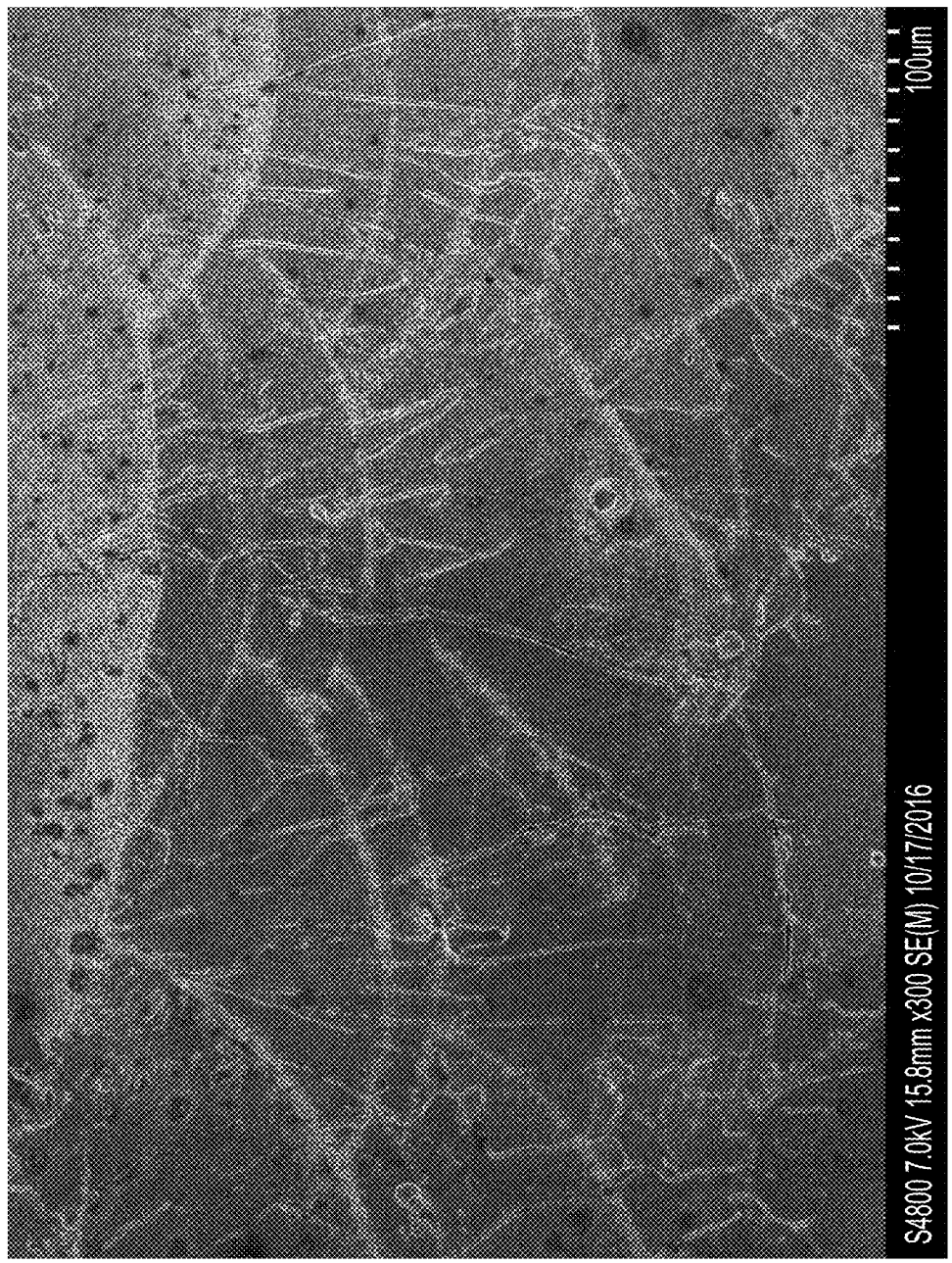
FIG. 4 is an SEM micrograph of a multipass laser weld in stock aluminum alloy Al 7075, showing hot cracking in the microstructure.
Figure 5:
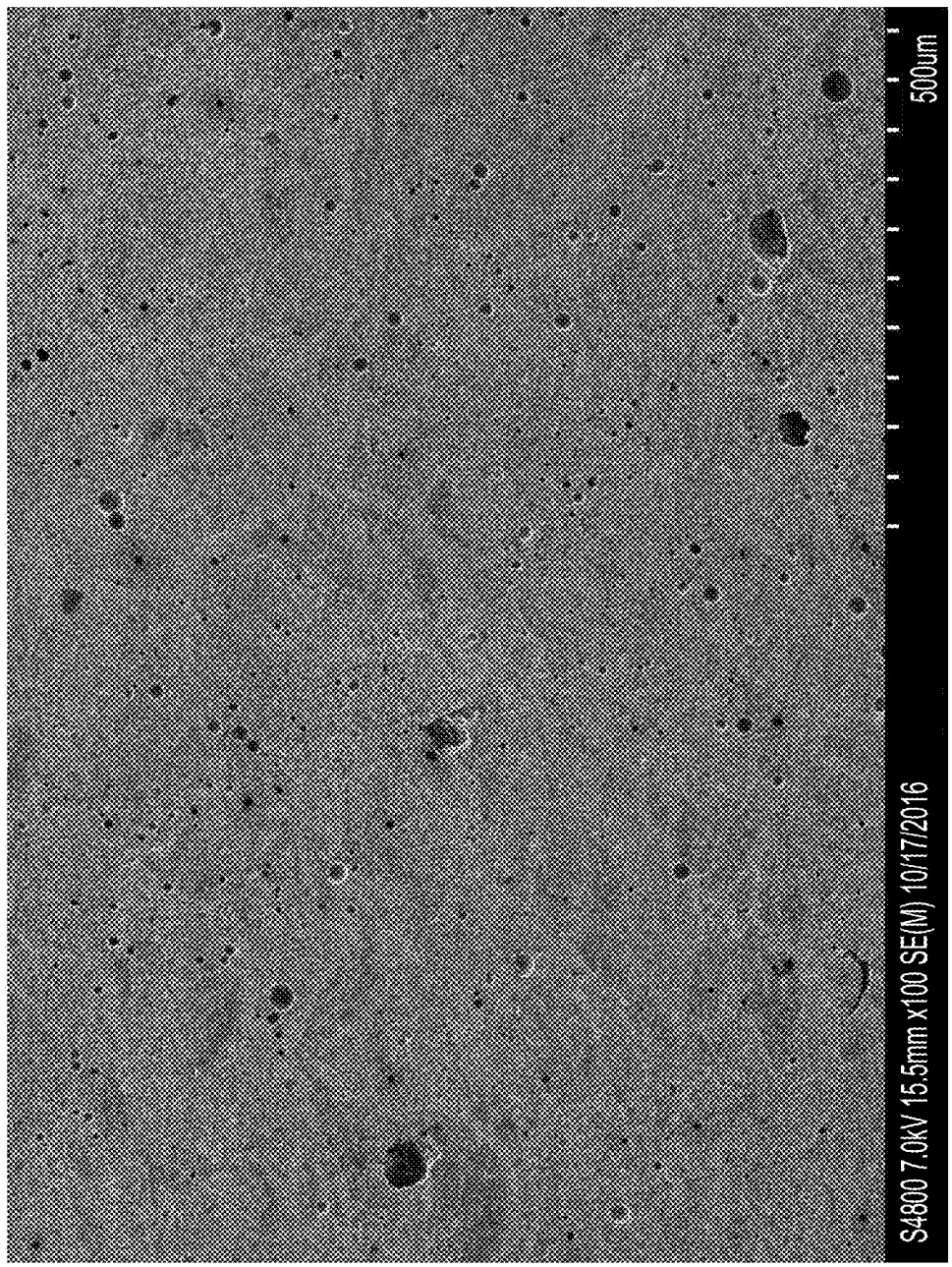
FIG. 5 is an SEM micrograph of an exemplary multipass laser weld in $ZrH_2$-functionalized aluminum alloy Al 7075, showing essentially no hot cracking in the microstructure.

The results of the weld system can be seen in the scanning electron microscopy (SEM) images of FIGS. 4 and 5. FIG. 4 is an SEM micrograph of a multipass laser weld in stock aluminum alloy Al 7075, which clearly shows the hot-cracking phenomena. FIG. 5 is an SEM micrograph of a multipass laser weld in ZrH$_2$-functionalized aluminum alloy Al 7075, showing essentially no hot cracking in the microstructure. The microstructure does contain a few porous voids larger than 1 micron.

In this Example, nanoparticle functionalization eliminates hot cracking in the final laser welds of aluminum alloy Al 7075. Zirconium-based grain-refinement nanoparticles have demonstrated the potential to greatly improve upon the quality of current laser-beam welding and arc-welding alloys, by eliminating commonly observed defects induced by hot cracking.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A welding filler material comprising a functionalized metal-containing powder, wherein said functionalized metal-containing powder comprises metal or metal alloy particles and a plurality of nanoparticles chemically and/or physically disposed on surfaces of said metal or metal alloy particles, wherein said nanoparticles are in the form of a continuous or intermittent coating on said metal or metal alloy particles, and wherein said nanoparticles are consolidated in a non-random three-dimensional architecture throughout said welding filler material such that there is some regularity in spacing between said nanoparticles and said nanoparticles form a dispersed microstructure having an average dispersion length from 1 nanometer to 100 microns.

2. The welding filler material of claim 1, wherein said metal or metal alloy particles contain an element selected from the group consisting of Al, Mg, Ni, Fe, Cu, Ti, V, Si, and combinations thereof, and wherein said metal or metal alloy particles optionally contain one or more additional alloying elements.

3. The welding filler material of claim 1, wherein said metal or metal alloy particles include an aluminum alloy selected from the 2000 series of aluminum alloys.

4. The welding filler material of claim 1, wherein said metal or metal alloy particles include an aluminum alloy selected from the 6000 series of aluminum alloys.

5. The welding filler material of claim 1, wherein said metal or metal alloy particles include an aluminum alloy selected from the 7000 series of aluminum alloys.

6. The welding filler material of claim 1, wherein said nanoparticles contain a compound selected from the group consisting of metals, intermetallic alloys, hydrides, oxides, nitrides, borides, carbides, carbon, and combinations thereof.

7. The welding filler material of claim 1, wherein said nanoparticles contain zirconium hydride.

8. The welding filler material of claim 1, wherein said welding filler material contains from about 10 wt % to about 99.99 wt % of said metal or metal alloy particles.

9. The welding filler material of claim 1, wherein said welding filler material contains from about 0.01 wt % to about 10 wt % of said nanoparticles.

10. The welding filler material of claim 1, wherein said welding filler material contains a uniform concentration of nanoparticles.

11. The welding filler material of claim 1, wherein said welding filler material contains a functionally graded concentration of nanoparticles across at least one dimension of said welding filler material.

12. The welding filler material of claim 1, wherein said metal or metal alloy particles and said nanoparticles are disposed in a layered configuration within said welding filler material.

13. The welding filler material of claim 1, wherein the ratio of average particle size of said metal or metal alloy particles to average nanoparticle size of said nanoparticles is from about 10 to about $10^5$.

14. The welding filler material of claim 1, wherein said welding filler material is in a form selected from the group consisting of rods, wires, bars, plates, films, coils, spheres, cubes, prisms, cones, irregular shapes, and combinations thereof.

15. The welding filler material of claim 1, wherein said welding filler material is characterized by a volumetric density of at least 90% of theoretical.

16. A method of making a welding filler material, said method comprising:

(a) providing a precursor composition comprising metal-containing particles and nanoparticles, wherein said nanoparticles are chemically and/or physically disposed on surfaces of said metal-containing particles, wherein said nanoparticles are in the form of a continuous or intermittent coating on said metal-containing particles; and (b) consolidating said precursor composition into a welding filler material comprising said metal-containing particles and said nanoparticles, wherein said nanoparticles are consolidated in a non-random three-dimensional architecture throughout said welding filler material such that there is some regularity in spacing between said nanoparticles and said nanoparticles form a dispersed microstructure having an average dispersion length from 1 nanometer to 100 microns.

17. The method of claim 16, wherein consolidating in step (b) includes pressing, extruding, binding, sintering, or a combination thereof.

18. The method of claim 16, wherein said welding filler material is fabricated to be in a form selected from the group consisting of rods, wires, bars, plates, films, coils, spheres, cubes, prisms, cones, irregular shapes, and combinations thereof.

19. The method of claim 16, wherein step (b) produces a welding filler material that is characterized by a volumetric density of at least 90% of theoretical.

20. The method of claim 16, wherein said welding filler material contains a uniform concentration of nanoparticles.

21. The method of claim 16, wherein said welding filler material contains a functionally graded concentration of nanoparticles across at least one dimension of said welding filler material.

22. The method of claim 16, wherein said metal-containing particles contain an element selected from the group consisting of Al, Mg, Ni, Fe, Cu, Ti, V, Si, and combinations or alloys thereof.

23. The method of claim 16, wherein said nanoparticles contain a compound selected from the group consisting of metals, intermetallic alloys, hydrides, oxides, nitrides, borides, carbides, carbon, and combinations thereof.

24. A process of forming a welded object from multiple metal parts, said process comprising the method according to claim 16 followed by welding together said multiple metal parts, wherein said process includes introducing said welding filler material to a weld joint between said multiple metal parts, and wherein said weld joint contains equiaxed grains comprising said nanoparticles.

25. The process of claim 24, wherein said welded object contains essentially no hot cracks.

26. The welding filler material of claim 1, wherein said welding filler material is characterized in that when welded, said welding filler material forms equiaxed grains comprising said nanoparticles.

27. The method of claim 16, wherein said welding filler material is characterized in that when welded, said welding filler material forms equiaxed grains comprising said nanoparticles.

* * * * *